United States Patent
Sridharan et al.

(10) Patent No.: US 11,595,966 B2
(45) Date of Patent: Feb. 28, 2023

(54) TIME DOMAIN POSITIONS FOR DEMODULATION REFERENCE SIGNAL IN A MULTI-SLOT TRANSPORT BLOCK

(71) Applicant: QUALCOMM Incorporated, San Diego, CA (US)

(72) Inventors: Gokul Sridharan, Sunnyvale, CA (US); Seyedkianoush Hosseini, San Diego, CA (US); Hung Dinh Ly, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 66 days.

(21) Appl. No.: 17/190,172

(22) Filed: Mar. 2, 2021

(65) Prior Publication Data

US 2022/0287039 A1    Sep. 8, 2022

(51) Int. Cl.
*H04W 4/00* (2018.01)
*H04W 72/04* (2023.01)
*H04L 5/00* (2006.01)
*H04W 72/0446* (2023.01)

(52) U.S. Cl.
CPC ....... *H04W 72/0493* (2013.01); *H04L 5/0051* (2013.01); *H04W 72/042* (2013.01); *H04W 72/0446* (2013.01)

(58) Field of Classification Search
None
See application file for complete search history.

(56) References Cited

U.S. PATENT DOCUMENTS

| | | | |
|---|---|---|---|
| 2012/0082070 A1* | 4/2012 | Hart | H04J 11/0023 370/280 |
| 2019/0373486 A1 | 12/2019 | Bai et al. | |
| 2020/0045733 A1 | 2/2020 | Tiirola et al. | |
| 2020/0267774 A1* | 8/2020 | Vos | H04L 1/1861 |
| 2021/0058949 A1* | 2/2021 | Kim | H04W 72/1268 |
| 2021/0219327 A1* | 7/2021 | Jiang | H04L 5/0051 |

FOREIGN PATENT DOCUMENTS

| | | |
|---|---|---|
| EP | 3972316 A1 | 3/2022 |
| WO | WO-2020165835 A1 | 8/2020 |
| WO | WO-2020234932 A1 | 11/2020 |
| WO | WO-2021020826 A1 | 2/2021 |
| WO | WO-2022056835 A1 | 3/2022 |

OTHER PUBLICATIONS

International Search Report and Written Opinion—PCT/US2022/014925—ISA/EPO—dated May 27, 2022.

(Continued)

*Primary Examiner* — Zewdu A Beyen
(74) *Attorney, Agent, or Firm* — Patterson + Sheridan LLP

(57) ABSTRACT

Certain aspects of the present disclosure provide techniques for mapping time domain positions for a demodulation reference signal (DMRS). A method that may be performed by a user equipment (UE) includes identifying time domain positions for a DMRS to be transmitted with a transport block (TB) sent across multiple slots and transmitting the TB across the multiple slots with the DMRS in the time domain positions.

28 Claims, 14 Drawing Sheets

(56) References Cited

OTHER PUBLICATIONS

Moderator, et al., "Final FL Summary of TB Processing Over Multi-Slot PUSCH (AI 8.8.1.2)", 3GPP Draft, 3GPP TSG RAN WG1 #107-bis-e, R1-2200752, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 17, 2022-Jan. 25, 2022, Jan. 26, 2022 (Jan. 26, 2022), XP052103686, 117 Pages, Retrieved from the Internet: URL: https://ftp.3gpp.org/tsg_ran/WG1_RL1/TSGR1_107b-e/Inbox/R1-2200752.zip [107bis-e-NR-R17-CovEnh-02]-Final FL Summary of TB Processing Over Multi-Slot PUSCH (AI 8.8.1.2).docx [Retrieved on Jan. 26, 2022] Sect.s 6.1.2.3, 6.1.2.3.3, p. 9-p. 10.

* cited by examiner

TIME DOMAIN POSITIONS FOR DEMODULATION REFERENCE SIGNAL IN A MULTI-SLOT TRANSPORT BLOCK

BACKGROUND

Field of the Disclosure

Aspects of the present disclosure relate to wireless communications, and more particularly, to techniques for mapping time domain positions for a demodulation reference signal (DMRS).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include desirable channel estimation at a receiver for multi-slot transport block transmissions.

Certain aspects of the subject matter described in this disclosure can be implemented in a method for wireless communication by a user equipment (UE). The method generally includes identifying time domain positions for a demodulation reference signal (DMRS) to be transmitted with a transport block (TB) sent across multiple slots and transmitting the TB across the multiple slots with the DMRS in the time domain positions.

Certain aspects of the subject matter described in this disclosure can be implemented in a method for wireless communication by a network entity. The method generally includes identifying time domain positions for a DMRS to be received with a TB sent across multiple slots and receiving the TB across the multiple slots with the DMRS in the time domain positions.

Certain aspects of the subject matter described in this disclosure can be implemented in an apparatus for wireless communication. The apparatus generally includes a memory, a processor, and a transmitter. The processor is coupled to the memory, and the processor and the memory are configured to identify time domain positions for a DMRS to be transmitted with a TB sent across multiple slots. The transmitter is configured to transmit the TB across the multiple slots with the DMRS in the time domain positions.

Certain aspects of the subject matter described in this disclosure can be implemented in an apparatus for wireless communication. The apparatus generally includes a memory, a processor, and a receiver. The processor is coupled to the memory, and the processor and the memory are configured to identify time domain positions for a DMRS to be received with a TB sent across multiple slots. The receiver is configured to receive the TB across the multiple slots with the DMRS in the time domain positions.

Certain aspects of the subject matter described in this disclosure can be implemented in an apparatus for wireless communication. The apparatus generally includes means for identifying time domain positions for a DMRS to be transmitted with a TB sent across multiple slots; and means for transmitting the TB across the multiple slots with the DMRS in the time domain positions.

Certain aspects of the subject matter described in this disclosure can be implemented in an apparatus for wireless communication. The apparatus generally includes means for identifying time domain positions for a DMRS to be received with a TB sent across multiple slots; and means for receiving the TB across the multiple slots with the DMRS in the time domain positions.

Certain aspects of the subject matter described in this disclosure can be implemented in a computer-readable medium having instructions stored thereon for identifying time domain positions for a DMRS to be transmitted with a TB sent across multiple slots; and transmitting the TB across the multiple slots with the DMRS in the time domain positions.

Certain aspects of the subject matter described in this disclosure can be implemented in a computer-readable medium having instructions stored thereon for identifying time domain positions for a DMRS to be received with a TB sent across multiple slots; and receiving the TB across the multiple slots with the DMRS in the time domain positions.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure and the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
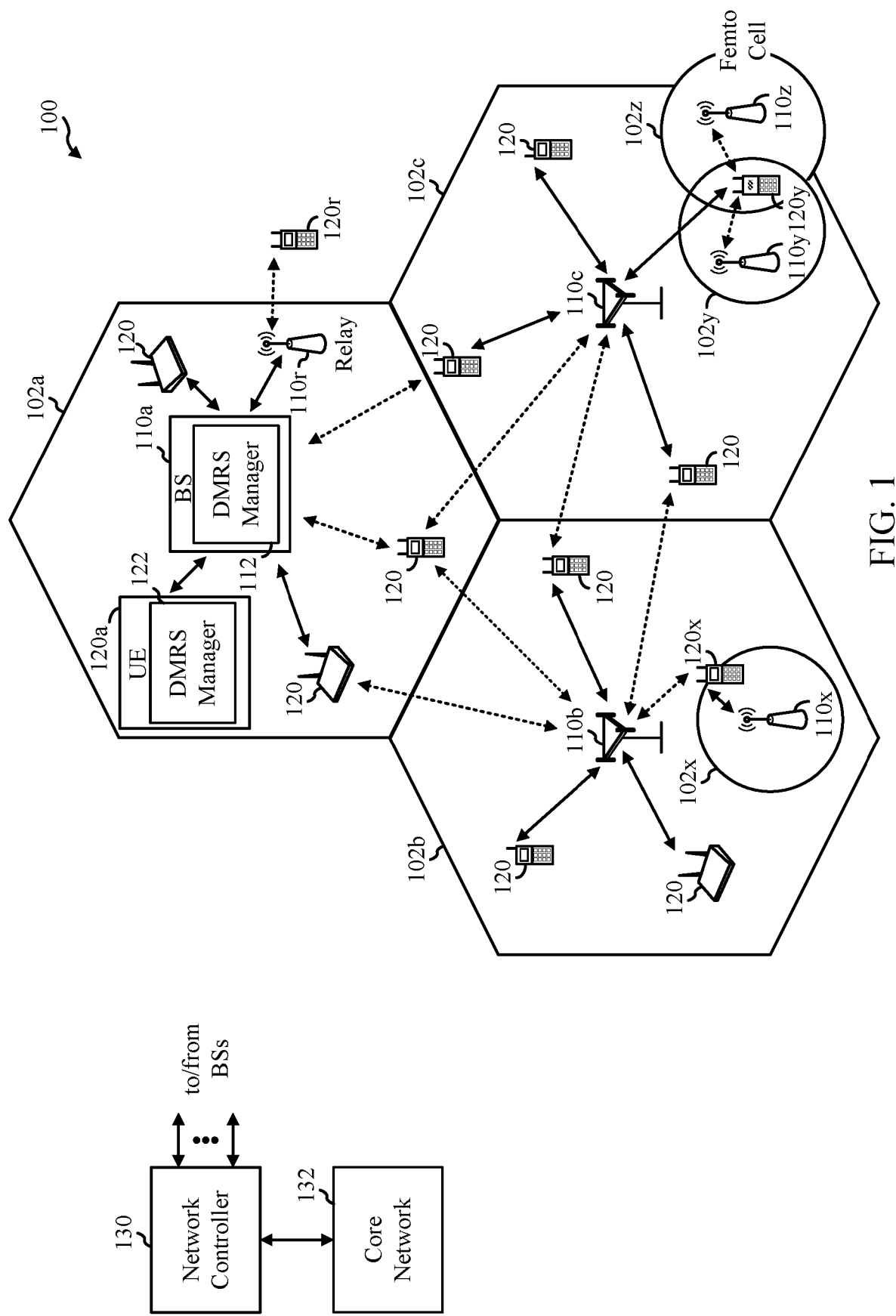
FIG. 1 is a block diagram conceptually illustrating an example wireless communication network, in accordance with certain aspects of the present disclosure.

Aspects of the present disclosure provide apparatus, methods, processing systems, and computer readable mediums for mapping time domain positions for a demodulation reference signal (DMRS) in a multi-slot transport block (TB). In certain cases, the DMRS time domain mapping may support a multi-slot TB with or without DMRS bundling. The DMRS time domain mapping described herein may enable channel estimation at the RAN for a multi-slot TB, which may provide desirable uplink performance, such as a desirable data rate, desirable latency, etc. In certain aspects, the DMRS time domain mapping described herein may enable a reduction in signaling overhead for DMRS bundling as fewer DMRSs may be mapped across the multi-slot TB.

The following description provides examples of mapping time domain positions for a DMRS in communication systems. Changes may be made in the function and arrangement of elements discussed without departing from the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE.

Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

As shown in FIG. 1, the BS 110a includes a DMRS manager 112 that identifies time domain positions for a DMRS in a multi-slot TB, in accordance with aspects of the present disclosure. The UE 120a includes a DMRS manager 122 that identifies time domain positions for a DMRS in a multi-slot TB, in accordance with aspects of the present disclosure.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120 in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In certain cases, the network controller 130 may include a centralized unit (CU) and/or a distributed unit (DU), for example, in a 5G NR system. In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
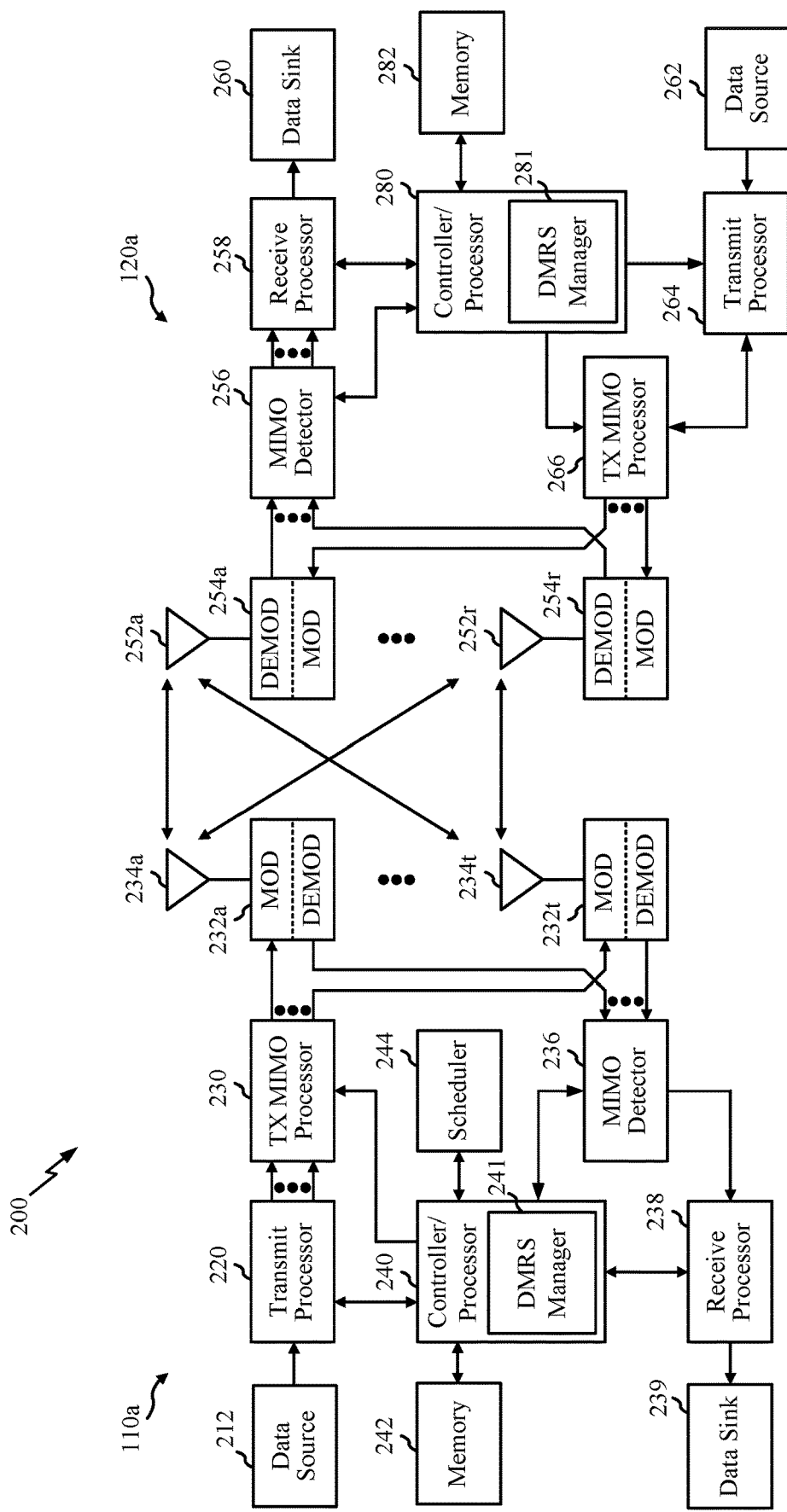
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the demodulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a DMRS manager 241 that identifies time domain positions for a DMRS in a multi-slot TB, according to aspects described herein. As shown in FIG. 2, the controller/processor 280 of the UE 120a has a DMRS manager 281 that identifies time domain positions for a DMRS in a multi-slot TB, according to aspects described herein. Although shown at the controller/processor, other components of the UE 120a and BS 110a may be used to perform the operations described herein.

While the UE 120a is described with respect to FIGS. 1 and 2 as communicating with a BS and/or within a network, the UE 120a may be configured to communicate directly with/transmit directly to another UE 120, or with/to another wireless device without relaying communications through a network. In some embodiments, the BS 110a illustrated in FIG. 2 and described above is an example of another UE 120.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
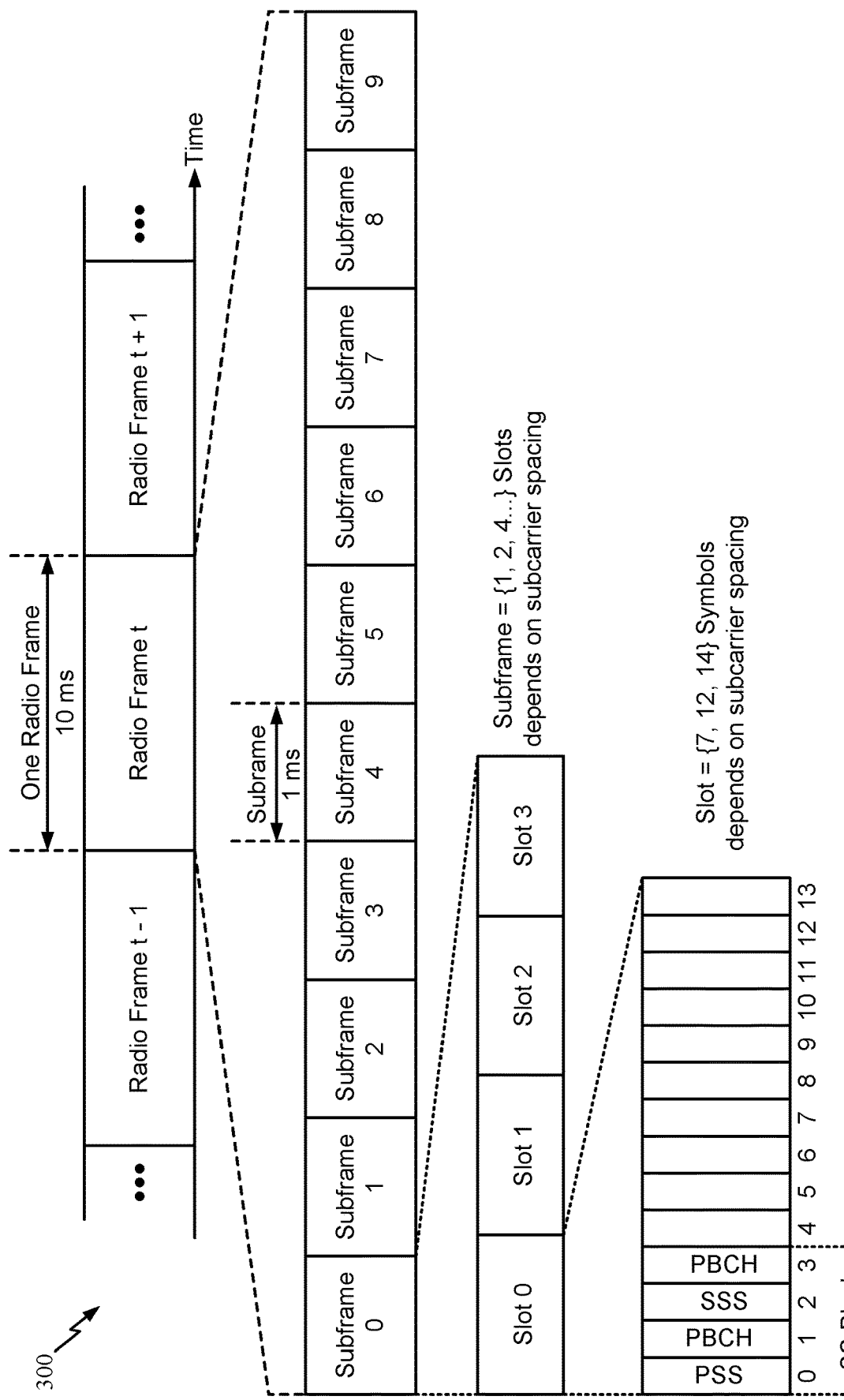
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A sub-slot structure may refer to a transmit time interval having a duration less than a slot (e.g., 2, 3, or 4 symbols). Each symbol in a slot may be configured for a link direction (e.g., downlink (DL), uplink (UL), or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst periodicity, system frame number, etc. The SSBs may be organized into an SS burst to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times within an SS burst, for example, with up to sixty-four different beam directions for mmWave. The multiple transmissions of the SSB are referred to as an SS burst in a half radio frame. SSBs in an SS burst may be transmitted in the same frequency region, while SSBs in different SS bursts can be transmitted at different frequency regions.

Figure 4A:
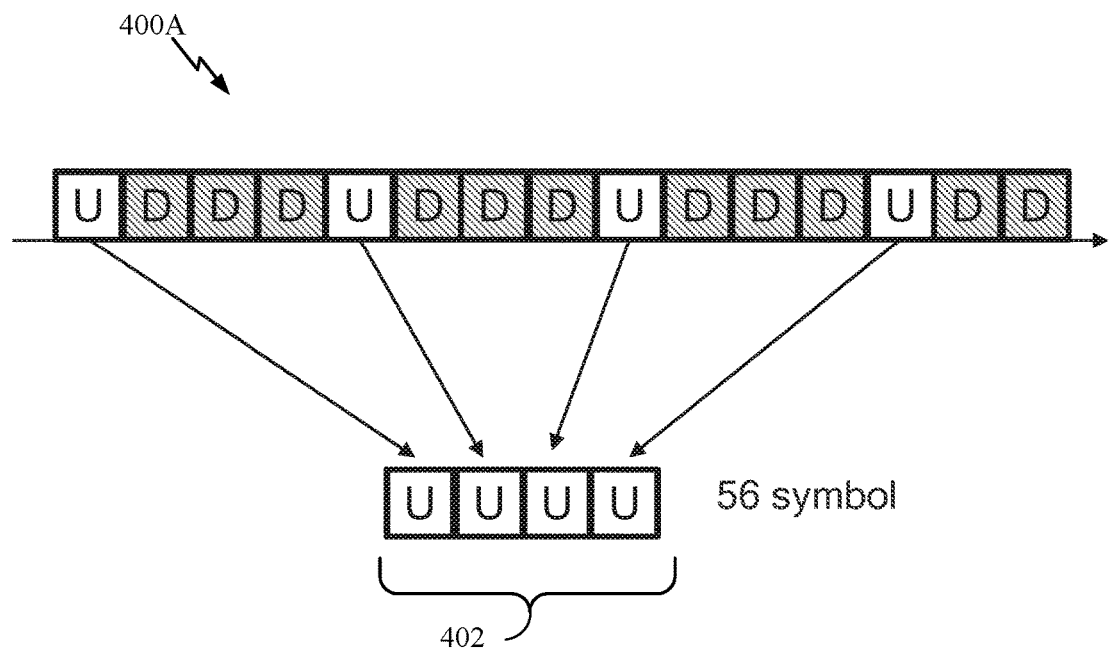
FIGS. 4A and 4B are diagrams illustrating examples of time-division duplex (TDD) schemes for downlink (DL) and uplink (UL) slots, in accordance with certain aspects of the present disclosure.
Figure 4B:
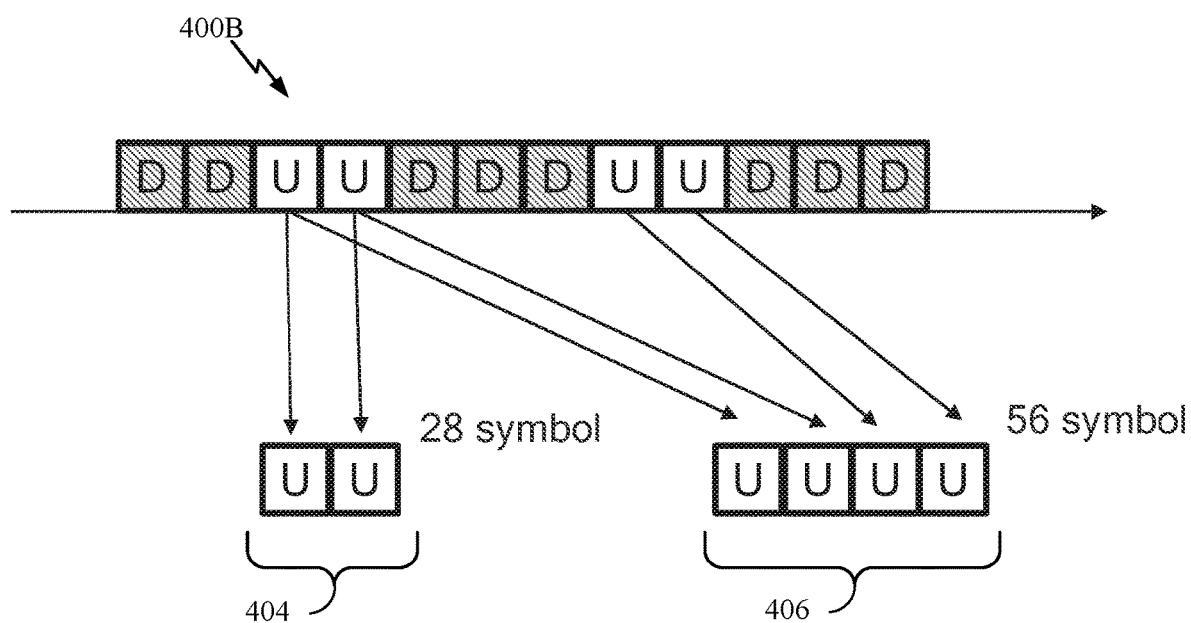

In certain wireless communication systems (e.g., NR), a transport block (TB) may span across multiple slots in the time domain. In other words, a TB may provide continuity of a data bit sequence across multiple slots. As used herein, such a TB may be referred to as a multi-slot TB transmission or a multi-slot TB. For example, FIGS. 4A and 4B illustrate examples of time-division duplex (TDD) schemes for downlink (DL) and uplink (UL) slots, in accordance with certain aspects of the present disclosure. Referring to FIG. 4A, an TDD UL-DL pattern 400A may have a periodic sequence of one UL slot followed by three DL slots. A multi-slot TB 402 may include four UL slots across the non-consecutive UL slots in the TDD UL-DL pattern 400A, and the multi-slot TB 402 may have a total of 56 symbols, for example. As shown in FIG. 4B, an TDD UL-DL pattern 400B may have a periodic sequence of two UL slots followed by three DL slots. In certain cases, a multi-slot TB 404 may include two consecutive UL slots having a total of 28 symbols. In certain aspects, a multi-slot TB 406 may include four UL slots with two pairs of consecutive UL slots having a total of 56 symbols. In other words, a multi-slot TB may include consecutive and/or non-consecutive UL slots. The encoded payload of a TB may be transmitted based on a single redundancy version (RV). In certain cases, a TB transmission may be referred to as a transmission occasion. If repetitions are allowed, the transport block may be transmitted over multiple transmission occasions.

Figure 5:
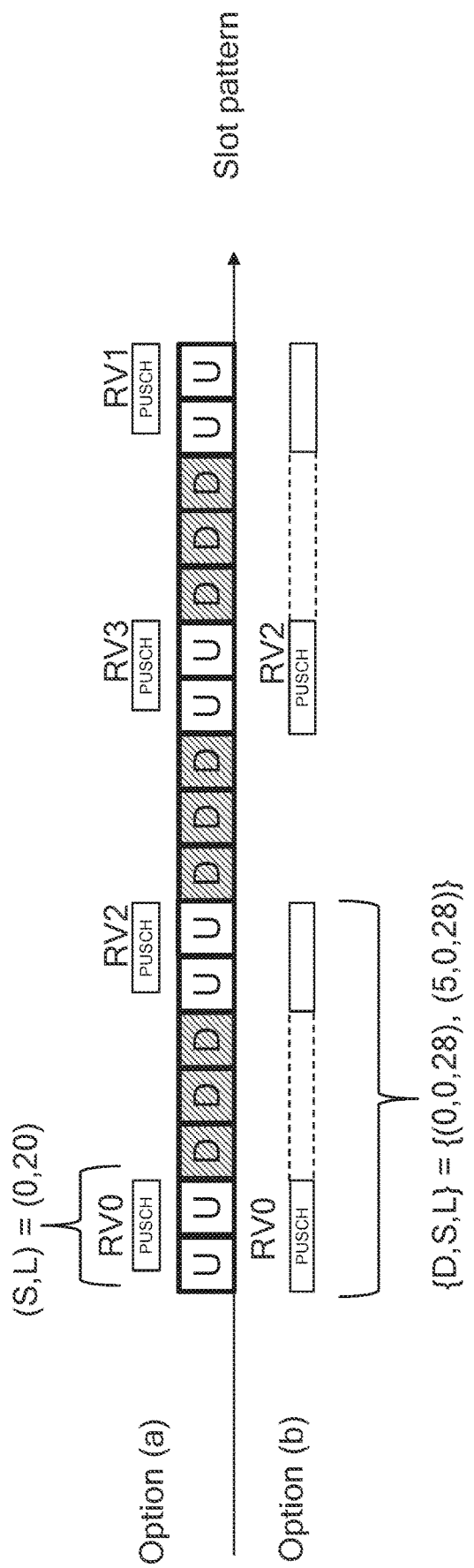
FIG. 5 is a diagram illustrating example time domain resource allocations for multi-slot transmissions, in accordance with certain aspects of the present disclosure.

FIG. 5 is a diagram illustrating example time domain resource allocations for multi-slot PUSCH transmissions, in accordance with certain aspects of the present disclosure. In option (a), a UE may be allocated consecutive time domain resources (e.g., symbols or slots) spanning one or more slots for a TB transmission, where the symbols may be from separate slots. The time domain resources for the TB transmission may be indicated via a time domain resource allocation (TDRA) table, which may include a start component (S) and a length component (L). In this example, the first PUSCH transmission in option (a) is allocated time domain resource via a TDRA table, where the start component is zero, and the length component is twenty symbols. The start component may represent the symbol index where the TB begins in the first slot. For example, a start of zero may indicate that the TB begins at the first symbol in the slot, and a start of six may indicate that the TB begins at the seventh symbol in the slot. The length may represent the duration in terms of symbols of the TB.

In option (b), a UE may be allocated sets of non-consecutive time domain resources for a TB transmission. The time domain resources for the TB transmission may be indicated via a time domain resource allocation (TDRA), which may include a set of triplets (D, S, L), where D indicates a slot index relative to a certain reference slot for the first slot in each of the contiguous segments, and S and L represents start symbol and duration, respectively. In this example, there are two segments represented by {D, S, L}={(0, 0, 28), (5, 0, 28)}, where the start and length components are the same values for each of the segments, but segments may have different values for the start and length components. A reference slot may be the slot where the uplink grant is received via downlink control information (DCI) or may be the slot indicated by the DCI as the beginning of the transmission occasion (which may be referred to as $K_2$ in the 3GPP standards for 5G NR).

FIG. 5 also depicts the RVs associated with each of the TB transmissions. For example, the first PUSCH transmission in option (a) may have a redundancy version of zero (RV0).

A transmitter may perform DMRS time domain bundling (also referred to herein as DMRS bundling), where a DMRS may be coherently transmitted over different transmission occasions (e.g., mini-slots or slots) using the same power and same precoder. For example, the transmitter may transmit one or more data packets with a DMRS having coherent phase (i.e., phase continuity) and consistent transmit power across different transmission occasions, such as consecutive transmission occasions or non-consecutive transmission occasions. At the receiver, the DMRS over different transmission occasions can be coherently filtered to enhance the accuracy of channel estimation. That is, the receiver may perform joint channel estimation over multiple transmission occasions (e.g., mini-slots or slots). DMRS bundling and/or joint channel estimation for uplink channels (e.g., PUSCH or PUCCH) may enable various coverage enhancements such as joint channel estimation over consecutive or non-consecutive uplink transmissions or inter-slot frequency hopping with inter-slot bundling.

In certain cases, a multi-slot TB may be transmitted with DMRS bundling at the UE. In other words, multi-slot TB and DMRS bundling may be jointly enabled for uplink and/or sidelink communications. For multi-slot TB transmissions, a UE may track transmitted bits closely, but there may not be a straightforward way to handle cancellations, multiplexing, etc. DCI misdetection may lead to changes in PUCCH multiplexing or slot format, which may lead to time domain misalignment between the radio access network (RAN) and UE.

The DMRS associated with the PUSCH may be used for radio channel estimation as part of coherent demodulation of the PUSCH. In 5G NR, the time domain mapping of the DMRS for a PUSCH may only support a single slot TB without DMRS bundling. Such a scheme, where the time domain positions for the DMRS are defined for a TB that is within a single slot and/or is up to 14 symbols in length, may be undesirable for a multi-slot TB. For example, a multi-slot TB may span across multiple slots without DMRS bundling such that the time domain mapping of the DMRS does not provide a DMRS for the subsequent slots past the first slot in the multi-slot TB. This may lead to errors in the channel estimation at the RAN and undesirable uplink performance. Accordingly, what is needed are techniques and apparatus for mapping the time domain positions for the DMRS in a multi-slot TB, and in certain cases, a DMRS mapping that can support DMRS bundling for a multi-slot TB.

Example Time Domain Positions for DMRS in a Multi-Slot TB

Aspects of the present disclosure provide techniques and apparatus for mapping time domain positions for a DMRS in a multi-slot TB. In certain cases, the DMRS time domain mapping may support a multi-slot TB with or without DMRS bundling.

The DMRS time domain mapping described herein may enable channel estimation at the RAN for a multi-slot TB, which may provide desirable uplink performance, such as a desirable data rate, desirable latency, etc. In certain aspects, the DMRS time domain mapping described herein may enable a reduction in signaling overhead for DMRS bundling as fewer DMRSs may be mapped across the multi-slot TB.

Figure 6:
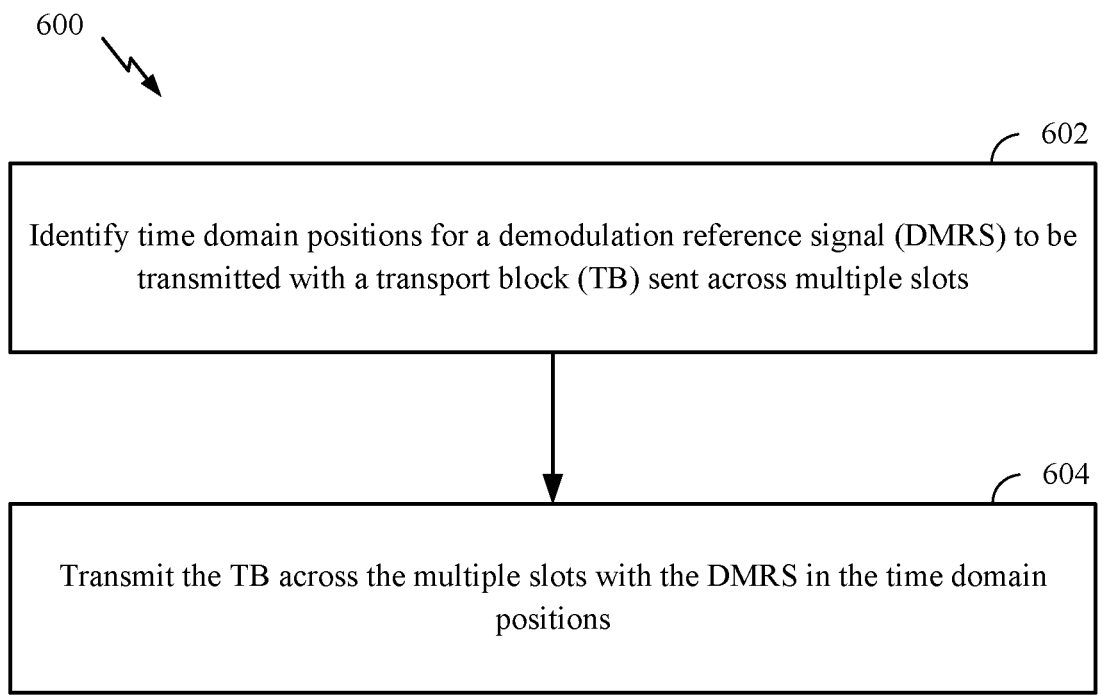
FIG. 6 is a flow diagram illustrating example operations for wireless communication by a UE, in accordance with certain aspects of the present disclosure.

FIG. 6 is a flow diagram illustrating example operations 600 for wireless communication, in accordance with certain aspects of the present disclosure. The operations 600 may be performed, for example, by a UE (such as the UE 120a in the wireless communication network 100). The operations 600 may be implemented as software components that are executed and run on one or more processors (e.g., controller/processor 280 of FIG. 2). Further, the transmission and reception of signals by the UE in operations 600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 600 may begin, at block 602, where the UE may identify time domain positions for a DMRS to be transmitted with a TB sent across multiple slots (i.e., a multi-slot TB). As further described herein with respect to FIGS. 9-11, the time domain positions may be identified on a per-slot basis, which may provide support for a multi-slot TB transmission without DMRS bundling. In certain aspects, the time domain positions may be identified on a nominal slot basis, where nominal or relative slots are identified relative to the start of the PUSCH allocation for the TB, as further described herein with respect to FIG. 12. The nominal or relative slots may provide support for a multi-slot TB transmission with DMRS bundling.

At block 604, the UE may transmit the TB across the multiple slots with the DMRS in the time domain positions. For example, the UE may transmit the TB to a base station (e.g., the BS 110a) via a PUSCH.

Figure 7:
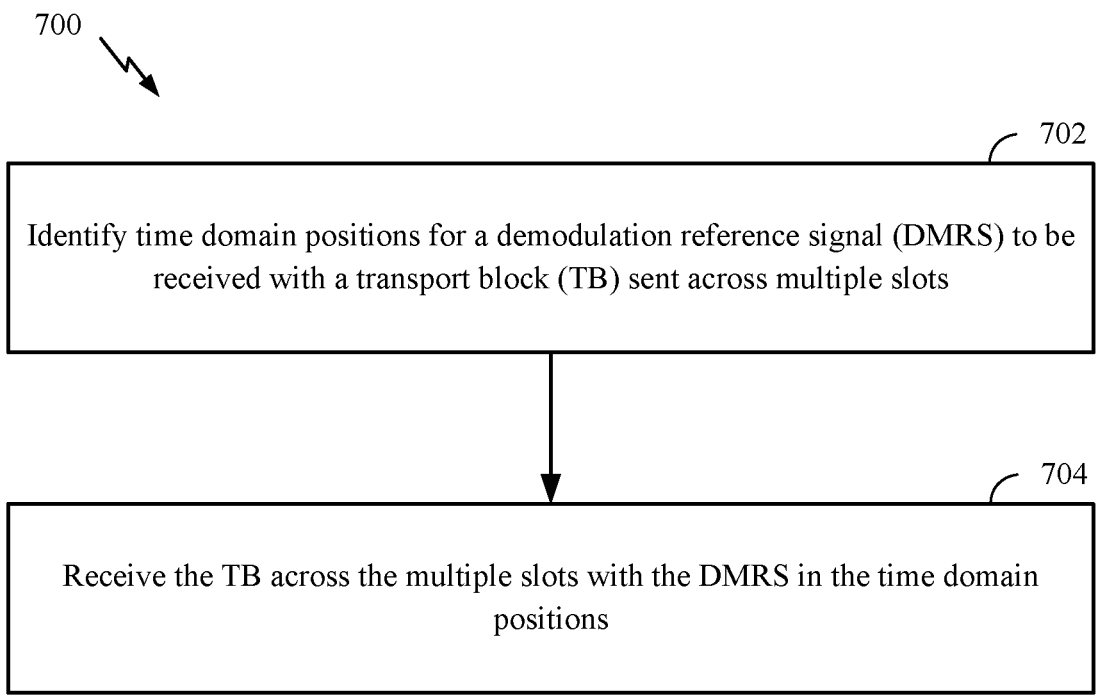
FIG. 7 is a flow diagram illustrating example operations for wireless communication by a network entity, in accordance with certain aspects of the present disclosure.

FIG. 7 is a flow diagram illustrating example operations 700 for wireless communication, in accordance with certain aspects of the present disclosure. The operations 700 may be performed, for example, by a network entity (such as the BS 110a in the wireless communication network 100). The operations 700 may be complementary to the operations 600 performed by the UE. The operations 700 may be implemented as software components that are executed and run on one or more processors (e.g., controller/processor 240 of FIG. 2). Further, the transmission and reception of signals by the BS in operations 700 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals. As used herein, a network entity may generally refer to a wireless communication device in a radio access network, such as a base station and/or network controller.

The operations 700 may begin, at block 702, where the network entity may identify time domain positions for a DMRS to be received with a TB sent across multiple slots. In aspects, the network entity may identify the DMRS time domain positions as described herein with respect to the operations 600, for example, on a per-slot basis or a nominal slot basis.

At block 704, the network entity may receive the TB across the multiple slots with the DMRS in the time domain positions. The network entity may receive the TB from a UE (e.g., the UE 120a)

The operations 600 and 700 of FIGS. 6 and 7 may be described with reference to the signaling flow diagram shown in FIG. 8. At 802, the UE 120 may receive, from the BS 110, an uplink channel configuration indicating one or more parameters associated with an uplink channel, such as the PUSCH. For example, at 802, the UE may be configured with one or more time domain resource allocation (TDRA) tables, values for the start and length components of a TB for the PUSCH, a value for $l_0$ for mapping type A, whether DMRS bundling is enabled or disabled, etc. The UE may receive the uplink channel configuration via system information (e.g., a SIB), radio resource control signaling, and/or downlink control information.

At 804, the UE 120 may receive, from the BS 110, an uplink grant scheduling a multi-slot TB transmission with or without DMRS bundling. The uplink grant may indicate a row index associated with a specific TDRA table, which may indicate the mapping type, symbol start index, and length value for the TB associated with the row index, for example, as further described herein with respect to Table 3. For certain cases, the uplink grant may indicate an index associated with a specific set of TDRA parameters in a list of TDRA parameters (e.g., pusch-TimeDomainAllocationList), where the set of TDRA parameters may indicate the mapping type, symbol start index, and length value for the TB. In certain aspects, the UE may ignore the indicated mapping type and determine the mapping type on a per-slot or nominal slot basis, as further described herein. That is, the UE may determine a separate mapping type for the multi-slot TB on a per-slot or nominal slot basis. In certain cases, the uplink grant may indicate whether DMRS bundling is enabled or disabled for the multi-slot TB.

At 806, the UE 120 may identify time domain positions for a DMRS in the multi-slot TB, for example, as described herein with respect to FIGS. 6 and 9-12. As an example, if DMRS bundling is enabled for the multi-slot TB, the UE may determine the DMRS positions on a nominal slot basis; otherwise, if DMRS bundling is not enabled, the UE may determine the DMRS positions on a per-slot basis. In certain cases, the UE may determine the DMRS positions on a per-slot basis or a nominal basis regardless of the DMRS bundling state for the TB.

At 808, the UE 120 may transmit, to the BS 110, the TB across the multiple slots with the DMRS in the time domain positions identified at 806. For example, the UE 120 may transmit the TB via the PUSCH with the DMRS positioned on a per-slot basis.

A UE may identify the time domain positions for the DMRS on a per-slot basis. The UE may identify the slots that overlap with the time domain resources allocated for transmitting the TB (e.g., a TB transmission occasion). The UE may convert the start and length of the TB into constituent start and length components for each of the slots that overlap with the time domain resources allocated for the TB. In other words, the UE may segment the TB into constituent parts as determined by the slot boundaries of the overlapping slots, such that each constituent part of the TB is in a separate slot. The UE may assign the start and length components to each of the constituent parts. The start component may represent the symbol index where a constituent part begins in a slot. For example, a start of zero may indicate that the constituent part begins at the first symbol in the slot, and a start of six may indicate that the constituent part begins at the seventh symbol in the slot. The length may represent the duration in terms of symbols of the constituent part in the slot. The UE may identify the time domain positions for the DMRS based at least in part on the constituent start and length components for each of the slots.

In certain aspects, the UE may be configured with different mapping types (such as PUSCH mapping type A or PUSCH mapping type B, which may be referred to as mapping type A or mapping type B, respectively) for the DMRS, where different combinations of start and length components may be associated with certain mapping types. An example table for mapping lengths to DMRS positions for a single symbol DMRS may be provided as follows:

TABLE 1

| | DM-RS positions l | | | | | | | |
|---|---|---|---|---|---|---|---|---|
| | PUSCH mapping type A dmrs-AdditionalPosition | | | | PUSCH mapping type B dmrs-AdditionalPosition | | | |
| $l_d$ in symbols | pos0 | pos1 | pos2 | pos3 | pos0 | pos1 | pos2 | pos3 |
| <4 | — | — | — | — | $l_0$ | $l_0$ | $l_0$ | $l_0$ |
| 4 | $l_0$ | $l_0$ | $l_0$ | $l_0$ | $l_0$ | $l_0$ | $l_0$ | $l_0$ |
| 5 | $l_0$ | $l_0$ | $l_0$ | $l_0$ | $l_0$ | $l_0$, 4 | $l_0$, 4 | $l_0$, 4 |
| 6 | $l_0$ | $l_0$ | $l_0$ | $l_0$ | $l_0$ | $l_0$, 4 | $l_0$, 4 | $l_0$, 4 |
| 7 | $l_0$ | $l_0$ | $l_0$ | $l_0$ | $l_0$ | $l_0$, 4 | $l_0$, 4 | $l_0$, 4 |
| 8 | $l_0$ | $l_0$, 7 | $l_0$, 7 | $l_0$, 7 | $l_0$ | $l_0$, 6 | $l_0$, 3, 6 | $l_0$, 3, 6 |
| 9 | $l_0$ | $l_0$, 7 | $l_0$, 7 | $l_0$, 7 | $l_0$ | $l_0$, 6 | $l_0$, 3, 6 | $l_0$, 3, 6 |
| 10 | $l_0$ | $l_0$, 9 | $l_0$, 6, 9 | $l_0$, 6, 9 | $l_0$ | $l_0$, 8 | $l_0$, 4, 8 | $l_0$, 3, 6, 9 |
| 11 | $l_0$ | $l_0$, 9 | $l_0$, 6, 9 | $l_0$, 6, 9 | $l_0$ | $l_0$, 8 | $l_0$, 4, 8 | $l_0$, 3, 6, 9 |

TABLE 1-continued

| | DM-RS positions $\bar{l}$ | | | | | | | |
|---|---|---|---|---|---|---|---|---|
| $l_d$ in | PUSCH mapping type A dmrs-AdditionalPosition | | | | PUSCH mapping type B dmrs-AdditionalPosition | | | |
| symbols | pos0 | pos1 | pos2 | pos3 | pos0 | pos1 | pos2 | pos3 |
| 12 | $l_0$ | $l_0$, 9 | $l_0$, 6, 9 | $l_0$, 5, 8, 11 | $l_0$ | $l_0$, 10 | $l_0$, 5, 10 | $l_0$, 3, 6, 9 |
| 13 | $l_0$ | $l_0$, 11 | $l_0$, 7, 11 | $l_0$, 5, 8, 11 | $l_0$ | $l_0$, 10 | $l_0$, 5, 10 | $l_0$, 3, 6, 9 |
| 14 | $l_0$ | $l_0$, 11 | $l_0$, 7, 11 | $l_0$, 5, 8, 11 | $l_0$ | $l_0$, 10 | $l_0$, 5, 10 | $l_0$, 3, 6, 9 | where $l_d$ is the duration (in terms of symbols) of a particular constituent or segment of the TB between the first symbol of the segment in a slot and the last symbol of the segment in the slot. $l_0$ is the first position for the DMRS relative to the symbol indexes in a slot, and in certain cases, to may be configured to be the third (e.g., $l_0=2$) or fourth (e.g., $l_0=3$) symbol in the slot for mapping type A or fixed to the first symbol (e.g., $l_0=0$) in the slot for mapping type B. In other words, mapping type B may provide a front loaded DMRS such that the DMRS is always in the first symbol of a slot, whereas mapping type A may provide a configurable position for the first DMRS in a slot, which may not be frontloaded. In aspects, $l_0$ may depend on the start component of the TB segment as further described herein. pos0 through pos3 provide the positions for one, two, three, or four DMRSs in the slot, respectively.

An example table for mapping lengths to DMRS positions for a double-symbol DMRS may be provided as follows:

TABLE 2

| | DM-RS positions $\bar{l}$ | | | | | | | |
|---|---|---|---|---|---|---|---|---|
| $l_d$ in | PUSCH mapping type A dmrs-AdditionalPosition | | | | PUSCH mapping type B dmrs-AdditionalPosition | | | |
| symbols | pos0 | pos1 | pos2 | pos3 | pos0 | pos1 | pos2 | pos3 |
| <4 | — | — | | | — | — | | |
| 4 | $l_0$ | $l_0$ | | | | | | |
| 5 | $l_0$ | $l_0$ | | | $l_0$ | $l_0$ | | |
| 6 | $l_0$ | $l_0$ | | | $l_0$ | $l_0$ | | |
| 7 | $l_0$ | $l_0$ | | | $l_0$ | $l_0$ | | |
| 8 | $l_0$ | $l_0$ | | | $l_0$ | $l_0$, 5 | | |
| 9 | $l_0$ | $l_0$ | | | $l_0$ | $l_0$, 5 | | |
| 10 | $l_0$ | $l_0$, 8 | | | $l_0$ | $l_0$, 7 | | |
| 11 | $l_0$ | $l_0$, 8 | | | $l_0$ | $l_0$, 7 | | |
| 12 | $l_0$ | $l_0$, 8 | | | $l_0$ | $l_0$, 9 | | |
| 13 | $l_0$ | $l_0$, 10 | | | $l_0$ | $l_0$, 9 | | |
| 14 | $l_0$ | $l_0$, 10 | | | $l_0$ | $l_0$, 9 | | |

In this example table, due to the symbol duration of the DMRS, up to two DMRSs may only be arranged in a slot.

As an example, suppose the UE is scheduled to transmit a multi-slot TB that starts in the seventh symbol of a slot and has a duration of twelve symbols. Assuming a fourteen symbol slot duration, the multi-slot TB would span across two slots with eight symbols in the first slot and four symbols in the second slot. The UE may segment the TB into a first constituent part having eight symbols in the first slot and a second constituent part having the remaining four symbols in the second slot. The first constituent part may be assigned start and length components of six and eight respectively ($S_0=6$, $L_0=8$), and the second constituent part may be assigned start and length components of zero and four respectively ($S_1=0$, $L_1=4$). The UE may use Table 1 and/or Table 2 to identify the time domain positions for the DMRS in the first constituent part based on the start and length components ($S_0=6$, $L_0=8$), and the UE may use Table 1 and/or Table 2 to identify the time domain positions for the DMRS in the second constituent part based on the start and length components ($S_1=0$, $L_1=4$).

In aspects, the slots that overlap with the TB may align with and/or be synchronized with a timing reference. The timing reference may be a reference frame and its corresponding system frame number, which may be indicated by an SSB. That is, the start positions of the slots that overlap with the TB may coincide with the start positions of the timing reference, such as the first symbol of a reference frame as indicated by an SSB.

In certain aspects, the time domain positions for the DMRS may depend on a mapping type, such as mapping Type A or B, and in certain cases, the mapping type may be determined by the start component and/or length component for the constituent parts. For example, if the constituent start component is less than or equal to a first threshold (e.g., zero), the UE may identify the time domain positions based at least in part on a first mapping type (e.g., mapping type A) for that particular slot associated with the constituent start component. The mapping type may be determined on a per-slot basis or applied consistently throughout the multi-slot TB.

In certain cases, if the constituent start component is less than or equal to the first threshold, the UE may select either mapping type A or B based on one or more criteria, such as the mapping type indicted in a TDRA table. The UE may select a mapping type among a plurality of mapping types (A or B) for a slot among the overlapping slots based on a TDRA table, if the constituent start component for the slot is less than or equal to the first threshold. That is, if the constituent start component for the slots is less than or equal to the first threshold, the UE may identify the time domain positions for the DMRS in the slot based on the mapping type indicted in the TDRA table signaled via DCI such as the uplink grant at 804. The UE may identify the time domain positions for the DMRS in the slot based on the selected mapping type, for example, via Table 1 and/or 2.

In certain cases, if the constituent start component is greater than the first threshold, the UE may identify the time domain positions based at least in part on a second mapping type (e.g., mapping type B) for the slot associated with the constituent start component. For example, when the start component is greater than zero, the UE may select mapping type B for determining the DMRS time domain positions in that slot associated with the start component.

In certain cases, if the constituent start component is less than or equal to the first threshold (e.g., 0) and the constituent length component is less than a second threshold (e.g., 4), the UE may identify the time domain positions based at least in part on the second mapping type (e.g., mapping type B) for the slot associated with the constituent start and length components. For example, when the start component equals zero and the length component is less than four for a constituent part, the UE may select mapping type B for DMRS time domain positions determination.

The UE may be configured with one or more TDRA tables, including but not limited to a default TDRA table and/or one or more network configured TDRA tables (e.g., pusch-TimeDomainAllocationList may include a TDRA table and may be provided in a pusch-ConfigCommon and/or pusch-Config). An example TDRA table, which maps the start and length components to a particular mapping type, for a normal cyclic prefix may be provided as follows:

TABLE 3

| Row index | PUSCH mapping type | S | L |
|---|---|---|---|
| 1 | Type A | 0 | 14 |
| 2 | Type A | 0 | 12 |
| 3 | Type A | 0 | 10 |
| 4 | Type B | 2 | 10 |
| 5 | Type B | 4 | 10 |
| 6 | Type B | 4 | 8 |
| 7 | Type B | 4 | 6 |
| 8 | Type A | 0 | 14 |
| 9 | Type A | 0 | 12 |
| 10 | Type A | 0 | 10 |
| 11 | Type A | 0 | 14 |
| 12 | Type A | 0 | 12 |
| 13 | Type A | 0 | 10 |
| 14 | Type B | 8 | 6 |
| 15 | Type A | 0 | 14 |
| 16 | Type A | 0 | 10 |

Figure 8:
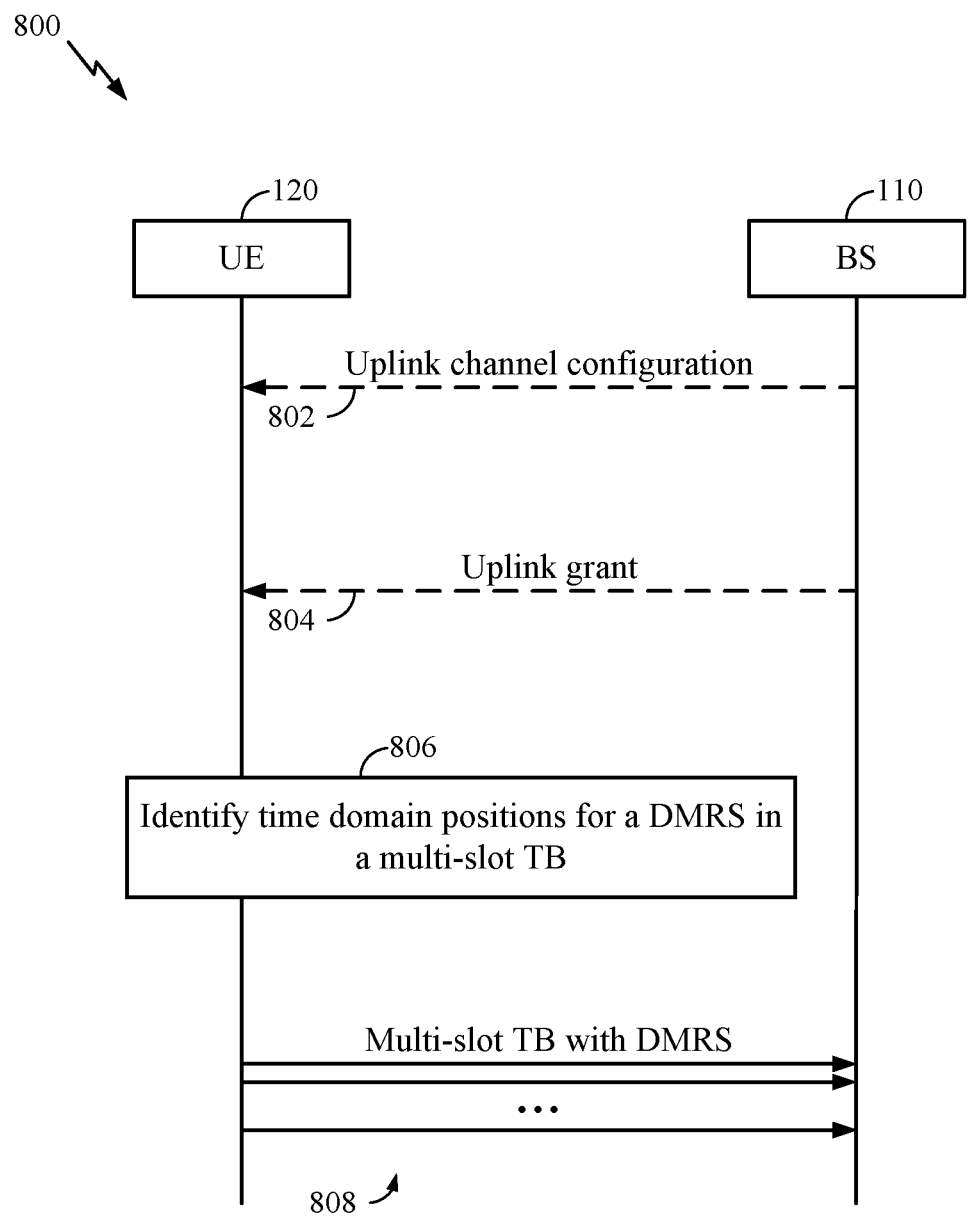
FIG. 8 is a signaling flow diagram illustrating example signaling for mapping demodulation reference signal (DMRS) time domain positions, in accordance with aspects of the present disclosure.

As described herein with respect to FIG. 8, the UE may receive an uplink grant indicating the time domain resource allocation for a TB based on a row index of a TDRA table and/or an index associated with a network configured TDRA table (which may be referred to as a TDRA list). The row index or list index of the TDRA table may be associated with a mapping time, start index (S), and a length (L). Whenever the constituent start and length components for a resource allocation allows for mapping type A and mapping type B, the UE may select the mapping type as indicated in the respective TDRA table, for example, the PUSCH mapping type column associated with a specific row in Table 3 and/or a mapping type parameter (e.g., mappingType) associated with a TDRA table in a list of tables (e.g., PUSCH-Time-DomainResourceAllocationList). In cases where the constituent start and length components per slot allows only mapping type B, the UE may use mapping type B for that constituent part (or nominal slot as further described herein), and the mapping type indicated via the TDRA table may be ignored. A further consideration is that the rules for determining time domain positions for each of the mapping types may be applied with regard to nominal slots as further described herein.

Those of skill in the art will understand that the parameters in Tables 1-3 are exemplary only. Additional or alternative parameters may be used in addition to or instead of those included in these example tables. For example, additional or alternative rows in Table 3 may include one or more time domain resource allocations with lengths (L) greater than 14 symbols, such as 20, 28, or 56 symbols. In certain cases, a TDRA table may include the scheduling offset $K_2$ (which may be in terms of slots, for example), start symbol index (S), allocation length (L), mapping type (e.g., type A or Type B), and/or a number of repetitions.

An advantage of Tables 1-3 is that these tables (and similar tables) may be cross-compatible for a single slot TB.

In other words, mapping types A and B and their respective tables may be employed for a single slot TB and/or a multi-slot TB. For multi-slot TB, the UE may translate the start and length components on a per-slot or nominal slot basis to the Tables 1-3, for example. In certain cases, the UE may be configured with a separate TDRA table for multi-slot TB transmissions.

For certain aspects, the UE determine the DMRS time domain positions on a relative or nominal slot basis. For example, the UE may identify nominal slots in time domain resources allocated for transmitting the TB, where the nominal slots are separate from the multiple slots in which the TB overlaps. The nominal slots may be shifted in time relative to a timing reference, such as a reference frame indicated by an SSB. That is, the beginning of the first nominal slot may be displaced from the first symbol of the timing reference by a certain number of symbols. The nominal slots may be virtual slots arranged in a sequence within the time domain resources allocated for transmitting the TB such that the beginning of the first nominal slot is aligned with the first symbol of the time domain resources allocated for transmitting the TB, for example, as further described herein with respect to FIG. 12. In other words, the nominal slots may be a sequence of virtual slots that start at the beginning of the time domain resources allocated for transmitting the TB, where the virtual slots may be separate from and/or shifted in time from the slots associated with the timing reference. The UE may identify constituent start and length components for each of the nominal slots, and the UE may identify the time domain positions for the DMRS based at least in part on the constituent start and length components for each of the nominal, for example, via Table 1 and/or Table 2.

With the nominal slot approach, the start component for the constituent parts may also be zero. As a result, the UE may select the mapping type according to a TDRA table. That is, the UE may select the mapping type for the constituent part as the mapping type indicated by a time domain resource allocation, for example, signaled via downlink control information. The UE may select a mapping type among a plurality of mapping types (A or B) for a nominal slot among the nominal slots based on a TDRA table, such as network configured TDRA tables suitable for a multi-slot TB with DMRS bundling. The UE may identify the time domain positions for the DMRS in the nominal slot based on the selected mapping type.

In certain cases, a constituent part of a TB transmission in the per-slot approach and/or the nominal slot approach may have a length of a single symbol. Without DMRS bundling, the UE may do the following with the single symbol constituent part: (a) use the symbol exclusively for DMRS, (b) use the symbol for the DMRS only when data-DMRS frequency domain multiplexing is possible and allowed; and/or (c) leave the symbol unused for the DMRS and/or the payload. When DMRS bundling is enabled, the single symbol constituent part may be used exclusively for DMRS. With respect to the operations 600, identification of the time domain positions at block 602 may include determining whether to use a symbol in a slot among the slots for the DMRS, if the constituent length component for the slot is equal to a third threshold (e.g., 1 symbol). For example, the UE may determine to arrange the DMRS in a single symbol constituent part. In certain cases, the UE may determine to arrange the DMRS in the single symbol constituent part, if the DMRS is frequency multiplexed with a data-carrying carrier (or subcarrier). In certain aspects, the UE may determine to refrain from using the single symbol constituent part for a payload and the DMRS.

In certain aspects, if the TB will be transmitted without DMRS bundling, the UE may determine the DMRS time domain positions on a per-slot basis as described herein. Otherwise, if the TB will be transmitted without DMRS bundling, the UE may determine the DMRS time domain positions on the nominal slot basis as described herein. That is, whether the DMRS positions are determined on a per-slot basis or a nominal slot basis may depend on whether the TB is transmitted with or without DMRS bundling.

Figure 9:
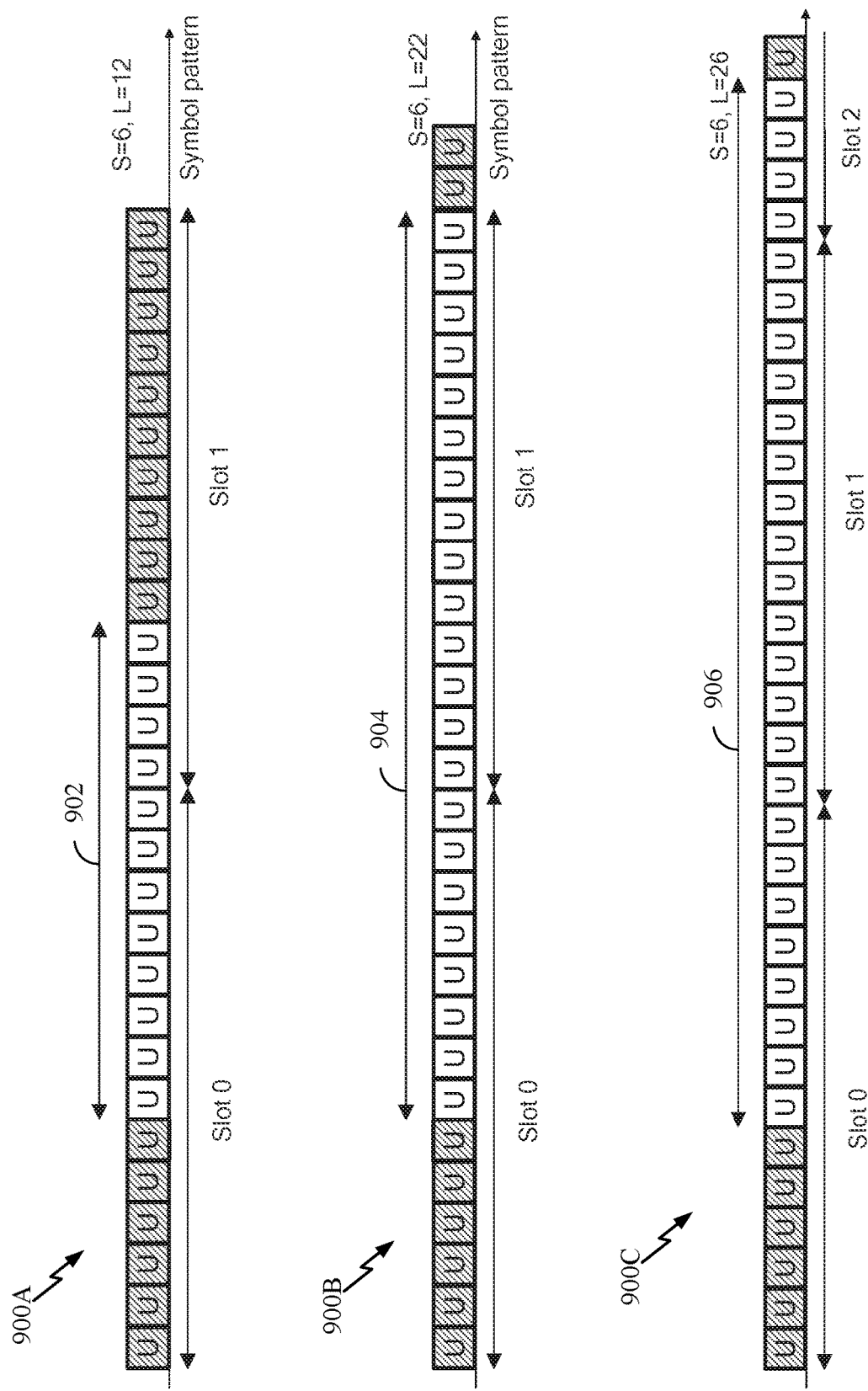
FIG. 9 is a diagram illustrating examples of multi-slot transport block (TB) allocations, in accordance with certain aspects of the present disclosure.

FIG. 9 illustrates examples of multi-slot TB allocations 900A-C, in accordance with certain aspects of the present disclosure. For the first allocation 900A, the UE may be allocated time domain resources for the first multi-slot TB 902 via a start index of six and a length of twelve symbols (e.g., S=6, L=12). In other words, the first multi-slot TB 902 may be less than a slot in length, but span across multiple slots. The start and length indicators for the PUSCH may be configured via control signaling such as system information, radio resource control signaling, and/or downlink control information. The start index indicates where the first symbol of the multi-slot TB is positioned relative to the symbol indexes of the first slot (e.g., slot 0). In other words, a symbol index of six corresponds to the seventh symbol in slot 0 due the first symbol of slot 0 having an index of zero. The length provides the duration of the multi-slot TB in terms of symbols. The slots (slots 0, 1, and 2) depicted in FIG. 9 may be aligned and/or synchronized with a timing reference such as a particular system frame number indicated by an SSB. For example, the first symbol of slot 0 may be aligned with the beginning of a slot or system frame for the timing reference.

For the second allocation 900B, the UE may be allocated time domain resources for the second multi-slot TB 904 via a start index of six and a length of twenty-two symbols (e.g., S=6, L=22). In other words, the second multi-slot TB 904 may have a length that is greater than a slot and span across two slots (slot 0 and slot 1).

For the third allocation 900C, the UE may be allocated time domain resources for the third multi-slot TB 906 via a start index of six and a length of twenty-six symbols (e.g., S=6, L=26). In other words, the third multi-slot TB 906 may have a duration greater than a slot and span across three slots (slot 0-2).

Figure 10:
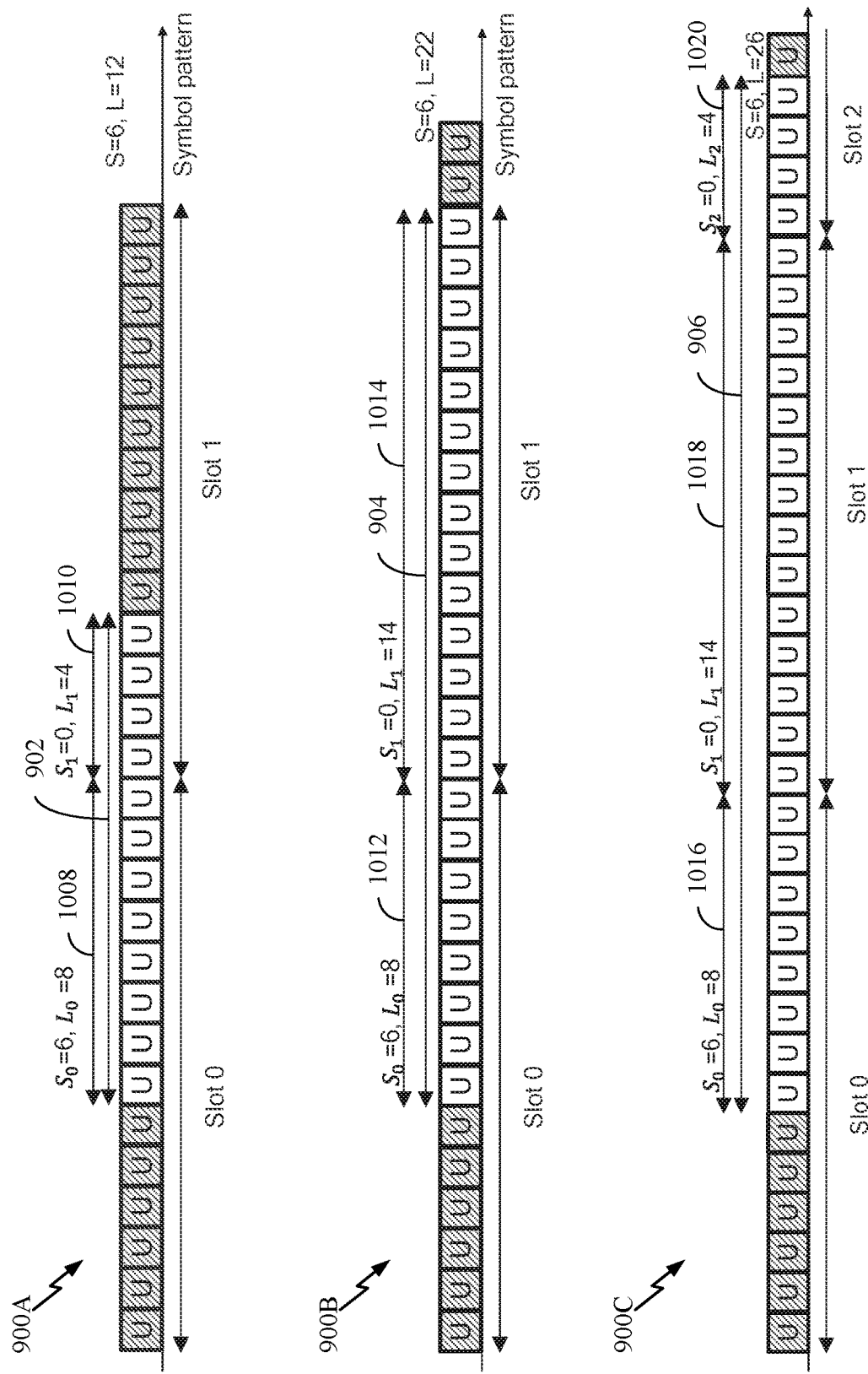
FIG. 10 is a diagram illustrating example segmentations of the multi-slot TBs on a per-slot basis, in accordance with certain aspects of the present disclosure.

FIG. 10 illustrates examples of segmenting the multi-slot TBs 902, 904, 906 on a per-slot basis, in accordance with certain aspects of the present disclosure. The UE may segment a multi-slot TB into constituent parts on a per-slot basis. For example, the UE may identify that the first multi-slot TB 902 overlaps with slot 0 and slot 1, and the UE may segment the first multi-slot TB 902 into a first constituent part 1008, which is the segment of the first multi-slot TB 902 that is in slot 0, and a second constituent part 1010, which is the next segment of the first multi-slot TB 902 that is in slot 1. The UE may determine constituent start and length components for each of the slots 0 and 1. In this example, the first constituent part 1008 has start and length components: $S_0=6$, $L_0=8$, and the second constituent part 1010 has start and length components: $S_1=0$, $L_1=4$. Using these start and length components, the UE may be able to determine the time domain positions for the DMRS as further described herein with respect to FIG. 11.

The second multi-slot TB 904 overlaps with slots 0 and 1 and has two constituent parts including a third constituent part 1012 and a fourth constituent part 1014. The third constituent part 1012 has start and length components: $S_0=6$, $L_0=8$, and the fourth constituent part 1014 has start and length components: $S_1=0$, $L_1=14$.

The third multi-slot TB 906 overlaps with slots 0 through 2 and has three constituent parts including a fifth constituent part 1016, a sixth constituent part 1018, and a seventh constituent part 1020. The fifth constituent part 1016 has start and length components: $S_0=6$, $L_0=8$; the sixth constituent part 1018 has start and length components: $S_1=0$, $L_1=14$; and the seventh constituent part 1020 has start and length components: $S_2=0$, $L_2=4$.

Figure 11:
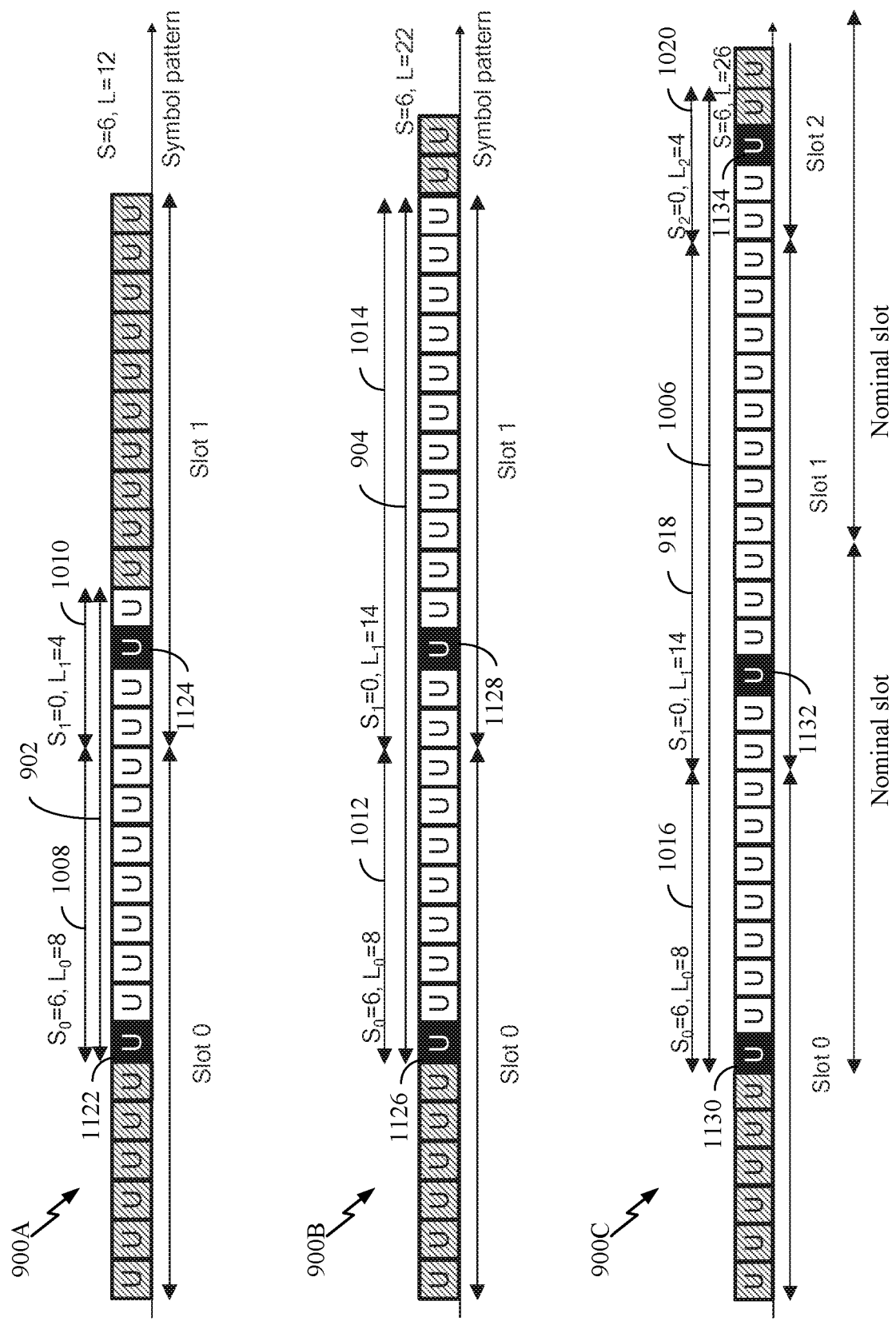
FIG. 11 is a diagram illustrating examples of DMRS time domain positions for the multi-slot TBs, in accordance with certain aspects of the present disclosure.

FIG. 11 illustrates examples of DMRS positions for the multi-slot TBs, in accordance with certain aspects of the present disclosure. As described herein, the UE may use the start and length components to determine the time domain positions for the DMRS in each of the constituent parts of the multi-slot TB. For the first constituent part 1008, due to the start component being greater than zero, the UE may identify the time domain positions based on the mapping type B, which is DMRS frontloaded (i.e., the first DMRS position is in the first symbol). As such, the first DMRS 1122 may be positioned at the first symbol of the first constituent part 1008, which corresponds to the seventh symbol in slot 0. For the second constituent part 1010, due to the start component being equal to zero, the UE may rely on a TDRA table to select the mapping type or rely on mapping type A to determine the time domain position for the DMRS. In this example, the UE relied on mapping type A, which may allow for the first DMRS position to be in the third or fourth symbol in the constituent part. As shown, the second DMRS 1124 is positioned in the third symbol of the second constituent part 1008. A similar or alternative process as described herein with respect to the operations 600 may be applied for determining the time domain positions for the third DMRS 1126 and fourth DMRS 1128 in the second multi-slot TB 904 and the fifth DMRS 1130, sixth DMRS 1132, and seventh DMRS 1134 in the third multi-slot TB 906.

Figure 12:
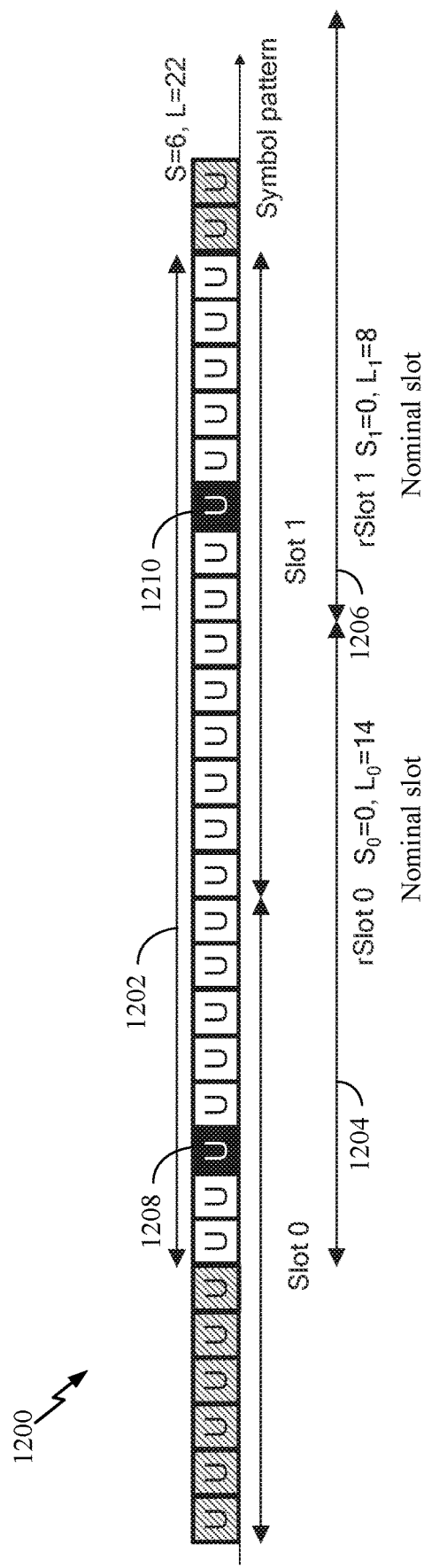
FIG. 12 is a diagram illustrating an example of DMRS positions arranged on a nominal slot basis for a multi-slot TB, in accordance with certain aspects of the present disclosure.

FIG. 12 illustrates an example of DMRS positions arranged on a nominal slot basis for a multi-slot TB, in accordance with certain aspects of the present disclosure. For a resource allocation 1200, the UE may be allocated time domain resources for a multi-slot TB 1202 having a start index of six and a length of 22 symbols. The UE may identify nominal slots that overlap with the multi-slot TB, where the beginning of the first nominal slot (rSlot 0) 1204 is aligned with the first symbol of the multi-slot TB 1202. In this example, the nominal slots have a duration of fourteen symbols, such that there is a second nominal slot (rSlot 1) 1206 that overlaps with the multi-slot TB 1202. In other words, the nominal slots 1204, 1206 may be shifted in time with respect to the slots 0 and 1, which are aligned with the timing reference.

The UE may identify the start and length components for each of the nominal slots. The first nominal slot 1204 has start and length components: $S_0=0$, $L_0=14$, and the second nominal slot 1206 has start and length components: $S_1=0$, $L_1=8$. The UE may select the mapping type for each of the nominal slots based on the mapping indicated in a TDRA table. For example, the TDRA table may indicate that mapping type A will be used for determining the DMRS positions in the nominal slots based on the respective start and length components for each of the nominal slots. That is, the start and length components for the nominal slots may be associated with a specific mapping type in the TDRA table, for example, as described herein with respect to Table 3. As shown, the first DMRS 1208 may be positioned in the third symbol of the first nominal slot 1204, and the second DMRS 1210 may also be positioned in the third symbol of the second nominal slot 1206 in accordance with mapping type A.

While the examples depicted in FIGS. 11 and 12 are described herein with respect to there being a single DMRS having a duration of a single symbol in each of the slots to facilitate understanding, aspects of the present disclosure may also be applied to two or more DMRSs being positioned in a slot or nominal slot that overlap with the multi-slot TB and/or a DMRS having a duration of two symbols.

While certain aspects of the present disclosure are described herein with respect to mapping time domain positions for a DMRS in an uplink context, aspects of the present disclosure may also be applied to sidelink and/or downlink multi-slot TB transmissions. For example, at block 604, the UE may receive, from a network entity, a TB across multiple slots with the DMRS in the time domain positions identified at block 602 as described herein.

Figure 13:
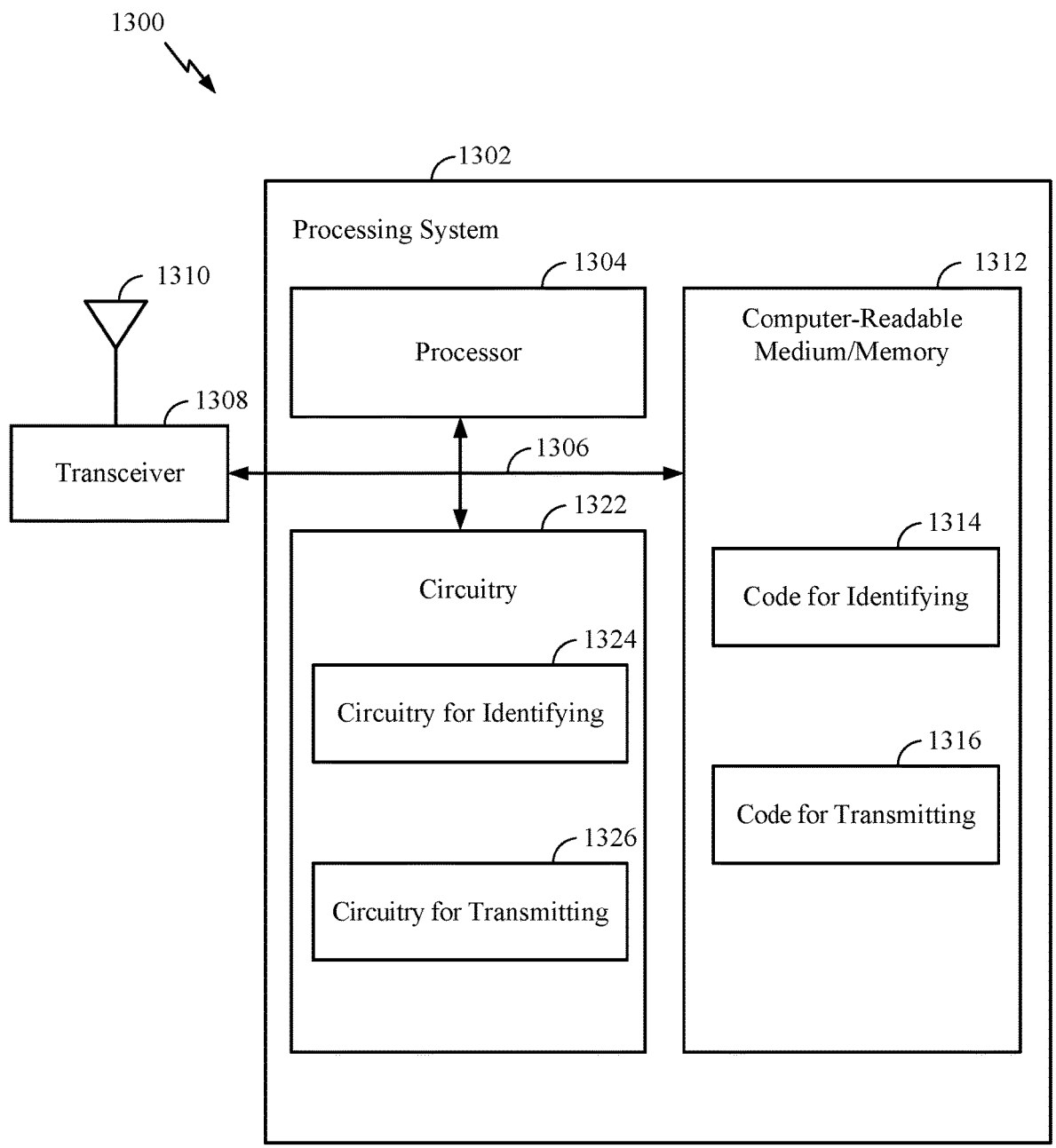
FIG. 13 illustrates a communications device (e.g., a UE) that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 6. The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 6, or other operations for performing the various techniques discussed herein for mapping DMRS time domain positions across a multi-slot TB. In certain aspects, computer-readable medium/memory 1312 stores code for identifying 1314 and/or code for transmitting 1316.

In certain aspects, the processing system 1302 has circuitry 1322 configured to implement the code stored in the computer-readable medium/memory 1312. In certain aspects, the circuitry 1322 is coupled to the processor 1304 and/or the computer-readable medium/memory 1312 via the bus 1306. For example, the circuitry 1322 includes circuitry for identifying 1324 and/or circuitry for transmitting 1326.

Figure 14:
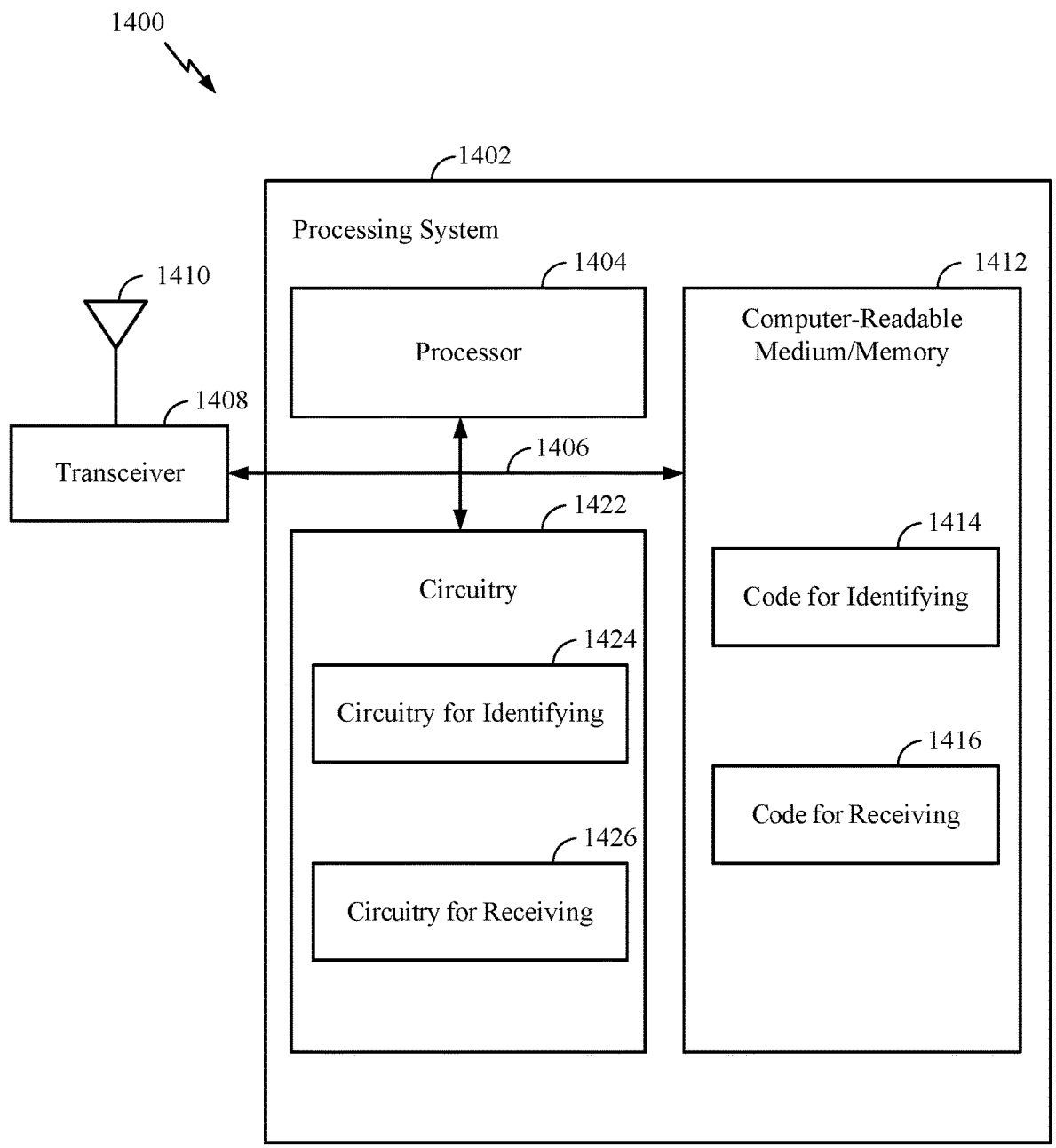
FIG. 14 illustrates a communications device (e.g., a BS) that may include various components configured to perform operations for the techniques disclosed herein in accordance with aspects of the present disclosure.

FIG. 14 illustrates a communications device 1400 that may include various components (e.g., corresponding to means-plus-function components) configured to perform operations for the techniques disclosed herein, such as the operations illustrated in FIG. 7. The communications device 1400 includes a processing system 1402 coupled to a transceiver 1408 (e.g., a transmitter and/or a receiver). The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/ memory 1412 is configured to store instructions (e.g., computer-executable code) that when executed by the processor 1404, cause the processor 1404 to perform the operations illustrated in FIG. 7, or other operations for performing the various techniques discussed herein for mapping DMRS time domain positions across a multi-slot TB. In certain aspects, computer-readable medium/memory 1412 stores code for identifying 1414 and/or code for receiving 1416. In certain aspects, the processing system 1402 has circuitry 1422 configured to implement the code stored in the computer-readable medium/memory 1412. In certain aspects, the circuitry 1422 is coupled to the processor 1404 and/or the computer-readable medium/memory 1412 via the bus 1406. For example, the circuitry 1422 includes circuitry for identifying 1424 and/or circuitry for receiving 1426.

Example Aspects

In addition to the various aspects described above, specific combinations of aspects are within the scope of the disclosure, some of which are detailed below:

Aspect 1. An apparatus for wireless communication, comprising: a memory; a processor coupled to the memory, the processor and the memory being configured to identify time domain positions for a demodulation reference signal (DMRS) to be transmitted with a transport block (TB) sent across multiple slots; and a transmitter configured to transmit the TB across the multiple slots with the DMRS in the time domain positions.

Aspect 2. The apparatus of claim 1, wherein the processor and the memory are further configured to: convert a start and a length of the TB into constituent start and length components for each of the slots that overlap with time domain resources allocated for transmitting the TB; and identify the time domain positions for the DMRS based at least in part on the constituent start and length components for each of the slots.

Aspect 3. The apparatus of claim 2, wherein the slots are aligned with a timing reference.

Aspect 4. The apparatus according to any of claim 2 or 3, wherein the processor and the memory are further configured to identify the time domain positions based at least in part on a first mapping type for a slot among the slots, if the constituent start component for the slot is equal to a first threshold.

Aspect 5. The apparatus according to any of claims 2-4, wherein the processor and the memory are further configured to identify the time domain positions based at least in part on a second mapping type for a slot among the slots, if the constituent start component for the slot is greater than a first threshold.

Aspect 6. The apparatus according to any of claims 2-5, wherein the processor and the memory are further configured to identify the time domain positions based at least in part on a second mapping type for a slot among the slots, if the constituent start component for the slot is equal to a first threshold and the constituent length component for the slot is less than a second threshold.

Aspect 7. The apparatus according to any of claims 2-6, wherein the processor and the memory are further configured to determine whether to use a symbol in a slot among the slots for the DMRS, if the constituent length component for the slot is equal to a third threshold.

Aspect 8. The apparatus according to any of claim 2, 3, or 5-7, wherein the processor and the memory are further configured to: select a mapping type among a plurality of mapping types for a slot among the slots based on a time domain resource allocation (TDRA) table, if the constituent start component for the slot is equal to a first threshold; and identify at least one of the time domain positions for the DMRS in the slot based on the selected mapping type.

Aspect 9. The apparatus according to any of claims 2-8, wherein the processor and the memory are further configured to identify the time domain positions for the DMRS based at least in part on the constituent start and length components if the TB will be transmitted without DMRS bundling.

Aspect 10. The apparatus of claim 1, wherein the processor and the memory are further configured to: identify nominal slots in time domain resources allocated for transmitting the TB; identify constituent start and length components for each of the nominal slots; and identify the time domain positions for the DMRS based at least in part on the constituent start and length components for each of the nominal slots.

Aspect 11. The apparatus of claim 10, wherein the nominal slots are shifted in time relative to a timing reference.

Aspect 12. The apparatus according to any of claim 10 or 11, wherein the processor and the memory are further configured to identify the time domain positions based at least in part on a mapping type among a plurality of mapping types for a nominal slot among the nominal slots, if the constituent start component for the nominal slot is equal to a first threshold and the constituent length component for the nominal slot is less than a second threshold.

Aspect 13. The apparatus according to any of claims 10-12, wherein the processor and the memory are further configured to: select a mapping type among a plurality of mapping types for a nominal slot among the nominal slots based on a TDRA table; and identify at least one of the time domain positions for the DMRS in the nominal slot based on the selected mapping type.

Aspect 14. The apparatus according to any of claims 10-13, wherein the processor and the memory are further configured to identify the time domain positions for the DMRS based at least in part on the constituent start and length components if the TB will be transmitted with DMRS bundling.

Aspect 15. An apparatus for wireless communication, comprising: a memory; a processor coupled to the memory, the processor and the memory configured to identify time domain positions for a demodulation reference signal (DMRS) to be received with a transport block (TB) sent across multiple slots; and a receiver configured to receive the TB across the multiple slots with the DMRS in the time domain positions.

Aspect 16. The apparatus of claim 15, wherein the processor and the memory are further configured to: convert a start and a length of the TB into constituent start and length components for each of the slots that overlap with time domain resources allocated for the TB; and identify the time domain positions for the DMRS based at least in part on the constituent start and length components for each of the slots.

Aspect 17. The apparatus of claim 16, wherein the slots are aligned with a timing reference.

Aspect 18. The apparatus according to any of claim 16 or 17, wherein the processor and the memory are further configured to identify the time domain positions based at least in part on a first mapping type for a slot among the slots, if the constituent start component for the slot is equal to a first threshold.

Aspect 19. The apparatus according to any of claims 16-18, wherein the processor and the memory are further configured to identify the time domain positions based at least in part on a second mapping type for a slot among the slots, if the constituent start component for the slot is greater than a first threshold.

Aspect 20. The apparatus according to any of claims 16-19, wherein the processor and the memory are further configured to identify the time domain positions based at least in part on a second mapping type for a slot among the slots, if the constituent start component for the slot is equal to a first threshold and the constituent length component for the slot is less than a second threshold.

Aspect 21. The apparatus according to any of claims 16-20, wherein the processor and the memory are further configured to determine whether to use a symbol in a slot among the slots for the DMRS, if the constituent length component for the slot is equal to a third threshold.

Aspect 22. The apparatus according to any of claim 16, 17, or 19-21, wherein the processor and the memory are further configured to: select a mapping type among a plurality of mapping types for a slot among the slots based on a time domain resource allocation (TDRA) table, if the constituent start component for the slot is equal to a first threshold; and identify at least one of the time domain positions for the DMRS in the slot based on the selected mapping type.

Aspect 23. The apparatus according to any of claims 16-22, wherein the processor and the memory are further configured to identify the time domain positions for the DMRS based at least in part on the constituent start and length components if the TB will be transmitted without DMRS bundling.

Aspect 24. The apparatus of claim 15, wherein the processor and the memory are further configured to: identify nominal slots in time domain resources allocated for transmitting the TB; identify constituent start and length components for each of the nominal slots; and identify the time domain positions for the DMRS based at least in part on the constituent start and length components for each of the nominal slots.

Aspect 25. The apparatus of claim 24, wherein the nominal slots are shifted in time relative to a timing reference.

Aspect 26. The apparatus according to any of claim 24 or 25, wherein the processor and the memory are further configured to identify the time domain positions based at least in part on a mapping type among a plurality of mapping types for a nominal slot among the nominal slots, if the constituent start component for the nominal slot is equal to a first threshold and the constituent length component for the nominal slot is less than a second threshold.

Aspect 27. The apparatus according to any of claims 24-26, wherein the processor and the memory are further configured to: select a mapping type among a plurality of mapping types for a nominal slot among the nominal slots based on a TDRA table; and identify at least one of the time domain positions for the DMRS in the nominal slot based on the selected mapping type.

Aspect 28. The apparatus according to any of claims 24-27, wherein the processor and the memory are further configured to identify the time domain positions for the DMRS based at least in part on the constituent start and length components if the TB will be transmitted with DMRS bundling.

Aspect 29. A method of wireless communication by a user equipment, comprising: identifying time domain positions for a demodulation reference signal (DMRS) to be transmitted with a transport block (TB) sent across multiple slots; and transmitting the TB across the multiple slots with the DMRS in the time domain positions.

Aspect 30. The method of claim 29, wherein identifying the time domain positions for the DMRS comprises: converting a start and a length of the TB into constituent start and length components for each of the slots that overlap with time domain resources allocated for transmitting the TB; and identifying the time domain positions for the DMRS based at least in part on the constituent start and length components for each of the slots.

Aspect 31. The method of claim 30, wherein the slots are aligned with a timing reference.

Aspect 32. The method according to any of claim 30 or 31, wherein identifying the time domain positions is based at least in part on a first mapping type for a slot among the slots, if the constituent start component for the slot is equal to a first threshold.

Aspect 33. The method according to any of claims 30-32, wherein identifying the time domain positions is based at least in part on a second mapping type for a slot among the slots, if the constituent start component for the slot is greater than a first threshold.

Aspect 34. The method according to any of claims 30-33, wherein identifying the time domain positions is based at least in part on a second mapping type for a slot among the slots, if the constituent start component for the slot is equal to a first threshold and the constituent length component for the slot is less than a second threshold.

Aspect 35. The method according to any of claims 30-34, wherein identifying the time domain positions comprises determining whether to use a symbol in a slot among the slots for the DMRS, if the constituent length component for the slot is equal to a third threshold.

Aspect 36. The method according to any of claim 30, 31, or 33-35, wherein identifying the time domain positions for the DMRS comprises: selecting a mapping type among a plurality of mapping types for a slot among the slots based on a time domain resource allocation (TDRA) table, if the constituent start component for the slot is equal to a first threshold; and identifying at least one of the time domain positions for the DMRS in the slot based on the selected mapping type.

Aspect 37. The method according to any of claims 30-36, wherein identifying the time domain positions for the DMRS is based at least in part on the constituent start and length components if the TB will be transmitted without DMRS bundling.

Aspect 38. The method of claim 29, wherein identifying the time domain positions for the DMRS comprises: identifying nominal slots in time domain resources allocated for transmitting the TB; identifying constituent start and length components for each of the nominal slots; and identifying the time domain positions for the DMRS based at least in part on the constituent start and length components for each of the nominal slots.

Aspect 39. The method of claim 38, wherein the nominal slots are shifted in time relative to a timing reference.

Aspect 40. The method according to any of claim 38 or 39, wherein identifying the time domain positions is based at least in part on a mapping type among a plurality of mapping types for a nominal slot among the nominal slots, if the constituent start component for the nominal slot is equal to a first threshold and the constituent length component for the nominal slot is less than a second threshold.

Aspect 41. The method according to any of claims 38-40, wherein identifying the time domain positions for the DMRS comprises: selecting a mapping type among a plurality of mapping types for a nominal slot among the nominal slots based on a TDRA table; and identifying at least one of the time domain positions for the DMRS in the nominal slot based on the selected mapping type.

Aspect 42. The method according to any of claims 38-41, wherein identifying the time domain positions for the DMRS is based at least in part on the constituent start and length components if the TB will be transmitted with DMRS bundling.

Aspect 43. A method of wireless communication by a network entity, comprising: identifying time domain positions for a demodulation reference signal (DMRS) to be received with a transport block (TB) sent across multiple slots; and receiving the TB across the multiple slots with the DMRS in the time domain positions.

Aspect 44. The method of claim 43, wherein identifying the time domain positions for the DMRS comprises: converting a start and a length of the TB into constituent start and length components for each of the slots that overlap with time domain resources allocated for the TB; and identifying the time domain positions for the DMRS based at least in part on the constituent start and length components for each of the slots.

Aspect 45. The method of claim 44, wherein the slots are aligned with a timing reference.

Aspect 46. The method according to any of claim 44 or 45, wherein identifying the time domain positions is based at least in part on a first mapping type for a slot among the slots, if the constituent start component for the slot is equal to a first threshold.

Aspect 47. The method according to any of claims 44-46, wherein identifying the time domain positions is based at least in part on a second mapping type for a slot among the slots, if the constituent start component for the slot is greater than a first threshold.

Aspect 48. The method according to any of claims 44-47, wherein identifying the time domain positions is based at least in part on a second mapping type for a slot among the slots, if the constituent start component for the slot is equal to a first threshold and the constituent length component for the slot is less than a second threshold.

Aspect 49. The method according to any of claims 44-48, wherein identifying the time domain positions comprises determining whether to use a symbol in a slot among the slots for the DMRS, if the constituent length component for the slot is equal to a third threshold.

Aspect 50. The method according to any of claim 44, 45, or 47-49, wherein identifying the time domain positions for the DMRS comprises: selecting a mapping type among a plurality of mapping types for a slot among the slots based on a time domain resource allocation (TDRA) table, if the constituent start component for the slot is equal to a first threshold; and identifying at least one of the time domain positions for the DMRS in the slot based on the selected mapping type.

Aspect 51. The method according to any of claims 44-50, wherein identifying the time domain positions for the DMRS is based at least in part on the constituent start and length components if the TB will be transmitted without DMRS bundling.

Aspect 52. The method of claim 43, wherein identifying the time domain positions for the DMRS comprises: identifying nominal slots in time domain resources allocated for transmitting the TB; identifying constituent start and length components for each of the nominal slots; and identifying the time domain positions for the DMRS based at least in part on the constituent start and length components for each of the nominal slots.

Aspect 53. The method of claim 52, wherein the nominal slots are shifted in time relative to a timing reference.

Aspect 54. The method according to any of claim 52 or 53, wherein identifying the time domain positions is based at least in part on a mapping type among a plurality of mapping types for a nominal slot among the nominal slots, if the constituent start component for the nominal slot is equal to a first threshold and the constituent length component for the nominal slot is less than a second threshold.

Aspect 55. The method according to any of claims 52-54, wherein identifying the time domain positions for the DMRS comprises: selecting a mapping type among a plurality of mapping types for a nominal slot among the nominal slots based on a TDRA table; and identifying at least one of the time domain positions for the DMRS in the nominal slot based on the selected mapping type.

Aspect 56. The method according to any of claims 52-55, wherein identifying the time domain positions for the DMRS is based at least in part on the constituent start and length components if the TB will be transmitted with DMRS bundling.

Aspect 57. An apparatus for wireless communication, comprising means for identifying time domain positions for a DMRS to be transmitted with a TB sent across multiple slots; and means for transmitting the TB across the multiple slots with the DMRS in the time domain positions.

Aspect 58. The apparatus of Aspect 57, the apparatus having means to perform Aspects 29 through 42.

Aspect 59. An apparatus for wireless communication, comprising means for identifying time domain positions for a DMRS to be received with a TB sent across multiple slots; and means for receiving the TB across the multiple slots with the DMRS in the time domain positions.

Aspect 60. The apparatus of Aspect 59, the apparatus having means to perform Aspects 43 through 56.

Aspect 61. A computer-readable medium having instructions stored thereon for identifying time domain positions for a DMRS to be transmitted with a TB sent across multiple slots; and transmitting the TB across the multiple slots with the DMRS in the time domain positions.

Aspect 62. The computer-readable medium of Aspect 61, the computer-readable medium having instructions stored thereon to perform Aspects 29 through 42.

Aspect 63. A computer-readable medium having instructions stored thereon for identifying time domain positions for a DMRS to be received with a TB sent across multiple slots; and receiving the TB across the multiple slots with the DMRS in the time domain positions.

Aspect 64. The computer-readable medium of Aspect 63, the computer-readable medium having instructions stored thereon to perform Aspects 43 through 56.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 6 and/or FIG. 7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above.

The invention claimed is:

1. An apparatus for wireless communication, comprising:
a receiver configured to receive a resource allocation for a transport block (TB) to be sent by the apparatus across multiple slots including a first starting symbol for sending the TB and a first total number of symbols for sending the TB;
a memory;
a processor coupled to the memory, the processor and the memory being configured to:
determine, for each slot of the multiple slots, a respective second starting symbol and a second total number of symbols for sending the TB in the slot based on the first starting symbol and the first total number of symbols; and
identify time domain positions for one or more demodulation reference signals (DMRSs) to be transmitted with the (TB) in the multiple slots based on the respective second starting symbol and second total number of symbols in each slot of the multiple slots; and
a transmitter configured to transmit the TB across the multiple slots with the one or more DMRSs in the time domain positions.

2. The apparatus of claim 1, wherein the slots are aligned with a timing reference.

3. The apparatus of claim 1, wherein the processor and the memory are further configured to identify the time domain positions in a slot of the multiple slots based at least in part on a first mapping type or a second mapping type when the second starting symbol for the slot is equal to a first threshold.

4. The apparatus of claim 3, wherein the processor and the memory are further configured to identify the time domain positions in a slot of the multiple slots based at least in part on the second mapping type when the second starting symbol for the slot is greater than the first threshold.

5. The apparatus of claim 1, wherein the processor and the memory are further configured to identify the time domain positions in a slot of the multiple slots based at least in part on a second mapping type when the second starting symbol for the slot is equal to a first threshold and the second total number of symbols for the slot is less than a second threshold.

6. The apparatus of claim 1, wherein the processor and the memory are further configured to determine whether to use a symbol in a slot of the multiple slots for the one or more DMRSs when the second total number of symbols for the slot is equal to a third threshold.

7. The apparatus of claim 1, wherein the processor and the memory are further configured to:
select a mapping type among a plurality of mapping types for a slot of the multiple slots based on a time domain resource allocation (TDRA) table when the second starting symbol for the slot is equal to a first threshold; and identify at least one of the time domain positions for the one or more DMRSs in the slot based on the selected mapping type.

8. The apparatus of claim 1, wherein the processor and the memory are configured to identify the time domain positions based at least in part on the respective second starting symbol and second total number of symbols when the TB is to be sent without DMRS bundling.

9. An apparatus for wireless communication, comprising:
a memory;
a processor coupled to the memory, the processor and the memory being configured to:
identify nominal slots in time domain resources allocated for transmitting a transport block (TB) across multiple slots;
identify constituent start components and constituent length components for each of the nominal slots; and
identify time domain positions for one or more demodulation reference signals (DMRSs) to be sent by the apparatus with the TB based at least in part on the constituent start and length components for each of the nominal slots; and
a transmitter configured to transmit the TB across the multiple slots with the one or more DMRSs in the time domain positions.

10. The apparatus of claim 9, wherein the nominal slots are shifted in time relative to a timing reference.

11. The apparatus of claim 9, wherein the processor and the memory are further configured to identify the time domain positions based at least in part on a mapping type among a plurality of mapping types for a nominal slot among the nominal slots when the constituent start component for the nominal slot is equal to a first threshold and the constituent length component for the nominal slot is less than a second threshold.

12. The apparatus of claim 9, wherein the processor and the memory are further configured to:
select a mapping type among a plurality of mapping types for a nominal slot among the nominal slots based on a time domain resource allocation (TDRA) table; and
identify at least one of the time domain positions for the one or more DMRSs in the nominal slot based on the selected mapping type.

13. The apparatus of claim 9, wherein the processor and the memory are configured to identify the time domain positions based at least in part on the constituent start and length components when the TB is to be sent without DMRS bundling.

14. An apparatus for wireless communication, comprising:
a memory;
a processor coupled to the memory, the processor and the memory configured to:
output a resource allocation for a transport block (TB) to be sent by another apparatus across multiple slots including a first starting symbol for sending the TB and a first total number of symbols for sending the TB;
determine, for each slot of the multiple slots, a respective second starting symbol and a second total number of symbols for sending the TB in the slot based on the first starting symbol and the first total number of symbols; and
identify time domain positions for one or more demodulation reference signals (DMRSs) to be received with the (TB) in the multiple slots based on the respective second starting symbol and second total number of symbols in each slot of the multiple slots; and
a receiver configured to receive the TB across the multiple slots with the one or more DMRSs in the time domain positions.

15. The apparatus of claim 14, wherein the slots are aligned with a timing reference.

16. The apparatus of claim 14, wherein the processor and the memory are further configured to identify the time domain positions in a slot of the multiple slots based at least in part on a first mapping type or a second mapping type for a slot among the slots when the second starting symbol for the slot is equal to a first threshold.

17. The apparatus of claim 16, wherein the processor and the memory are further configured to identify the time domain positions in a slot of the multiple slots based at least in part on the second mapping type when the second starting symbol for the slot is greater than the first threshold.

18. The apparatus of claim 14, wherein the processor and the memory are further configured to identify the time domain positions in a slot of the multiple slots based at least in part on a second mapping type when the second starting symbol for the slot is equal to a first threshold and the second total number of symbols for the slot is less than a second threshold.

19. The apparatus of claim 14, wherein the processor and the memory are further configured to determine whether to use a symbol in a slot of the multiple slots for the one or more DMRSs when the second total number of symbols for the slot is equal to a third threshold.

20. The apparatus of claim 14, wherein the processor and the memory are further configured to:
select a mapping type among a plurality of mapping types for a slot of the multiple slots based on a time domain resource allocation (TDRA) table when the second starting symbol for the slot is equal to a first threshold; and
identify at least one of the time domain positions for the one or more DMRSs in the slot based on the selected mapping type.

21. The apparatus of claim 14, wherein the processor and the memory are configured to identify the time domain positions based at least in part on the respective second starting symbol and second total number of symbols when the TB is to be sent without DMRS bundling.

22. An apparatus for wireless communication, comprising:
a memory;
a processor coupled to the memory, the processor and the memory being configured to:
identify nominal slots in time domain resources allocated for transmitting a transport block (TB) across multiple slots;
identify constituent start components and constituent length components for each of the nominal slots; and
identify time domain positions for one or more demodulation reference signals (DMRSs) to be sent with the TB based at least in part on the constituent start and length components for each of the nominal slots; and
a receiver configured to receive the TB across the multiple slots with the one or more DMRSs in the time domain positions.

23. The apparatus of claim 22, wherein the nominal slots are shifted in time relative to a timing reference.

24. The apparatus of claim 22, wherein the processor and the memory are further configured to identify the time domain positions based at least in part on a mapping type among a plurality of mapping types for a nominal slot among the nominal slots when the constituent start component for the nominal slot is equal to a first threshold and the constituent length component for the nominal slot is less than a second threshold.

25. The apparatus of claim 22, wherein the processor and the memory are further configured to:
select a mapping type among a plurality of mapping types for a nominal slot among the nominal slots based on a time domain resource allocation (TDRA) table; and
identify at least one of the time domain positions for the one or more DMRSs in the nominal slot based on the selected mapping type.

26. The apparatus of claim 22, wherein the processor and the memory are further configured to identify the time domain positions for the one or more DMRSs based at least in part on the constituent start and length components when the TB is to be sent with DMRS bundling.

27. A method of wireless communication by a user equipment, comprising:
receiving a resource allocation for a transport block (TB) to be sent by the user equipment across multiple slots including a first starting symbol for sending the TB and a first total number of symbols for sending the TB;
determining, for each slot of the multiple slots, a respective second starting symbol and a second total number of symbols for sending the TB in the slot based on the first starting symbol and the first total number of symbols; and
identifying time domain positions for one or more demodulation reference signals (DMRSs) to be transmitted with the (TB) in the multiple slots based on the respective second starting symbol and second total number of symbols in each slot of the multiple slots; and
transmitting the TB across the multiple slots with the one or more DMRSs in the time domain positions.

28. A method of wireless communication by a network entity, comprising:
outputting a resource allocation for a transport block (TB) to be sent by a user equipment across multiple slots including a first starting symbol for sending the TB and a first total number of symbols for sending the TB;
determining, for each slot of the multiple slots, a respective second starting symbol and a second total number of symbols for sending the TB in the slot based on the first starting symbol and the first total number of symbols; and
identifying time domain positions for one or more demodulation reference signals (DMRSs) to be received with the (TB) in the multiple slots based on the respective second starting symbol and second total number of symbols in each slot of the multiple slots; and
receiving the TB across the multiple slots with the one or more DMRSs in the time domain positions.

* * * * *